(12) United States Patent
Schmidt

(10) Patent No.: US 12,493,105 B2
(45) Date of Patent: Dec. 9, 2025

(54) REDUCING INTERFERENCE IN AN ACTIVE ILLUMINATION ENVIRONMENT

(71) Applicant: nLIGHT, Inc., Camas, WA (US)

(72) Inventor: Bodo Schmidt, Carlsbad, CA (US)

(73) Assignee: nLIGHT, Inc., Camas, WA (US)

( * ) Notice: Subject to any disclaimer, the term of this patent is extended or adjusted under 35 U.S.C. 154(b) by 0 days.

(21) Appl. No.: 18/176,258

(22) Filed: Feb. 28, 2023

(65) Prior Publication Data

US 2023/0204724 A1 Jun. 29, 2023

Related U.S. Application Data

(62) Division of application No. 16/228,565, filed on Dec. 20, 2018, now Pat. No. 11,614,517.

(51) Int. Cl.
*G01S 7/48* (2006.01)
*G01S 7/487* (2006.01)

(52) U.S. Cl.
CPC ............ *G01S 7/4804* (2013.01); *G01S 7/487* (2013.01)

(58) Field of Classification Search
None
See application file for complete search history.

(56) References Cited

U.S. PATENT DOCUMENTS

| | | | |
|---|---|---|---|
| 6,804,607 B1 | 10/2004 | Wood | |
| 7,518,728 B2 | 4/2009 | Koo | |
| 2003/0169413 A1* | 9/2003 | Stanek | G06V 10/88 356/2 |
| 2010/0128109 A1* | 5/2010 | Banks | H04N 13/296 348/46 |
| 2016/0069998 A1* | 3/2016 | Takasuka | G01S 17/26 356/5.01 |
| 2018/0130209 A1* | 5/2018 | Price | G06V 20/10 |

FOREIGN PATENT DOCUMENTS

| | | |
|---|---|---|
| DE | 19523528 A1 | 2/1996 |
| DE | 10341671 A1 | 4/2005 |

* cited by examiner

*Primary Examiner* — Hovhannes Baghdasaryan
(74) *Attorney, Agent, or Firm* — Wiley Rein LLP

(57) ABSTRACT

Apparatuses, systems and methods are disclosed for reducing interference between an active illumination device and external radiation sources, for example, other active illumination devices operating within the vicinity. A disclosed system includes one or more active illumination devices, each configured to emit an illumination signal and also to receive a returned portion of its respective illumination signal with at least one sensor. At least one of the active illumination devices is capable of detecting interference caused by an external source, for example, an illumination signal emitted from another active illumination device. As a result of detecting the interference, the receiving active illumination device changes the timing of its subsequent illumination signals and sensor operation. By detecting collisions between illumination signals and consequently altering the timing of it operation, the active illumination device may reduce interference in congested environments where multiple active illumination devices are operating within range of each other.

6 Claims, 11 Drawing Sheets

REDUCING INTERFERENCE IN AN ACTIVE ILLUMINATION ENVIRONMENT

CROSS-REFERENCE TO RELATED APPLICATIONS

This application is a divisional of U.S. application Ser. No. 16/228,565, filed on Dec. 20, 2018, which is hereby incorporated by reference in its entirety.

TECHNICAL FIELD

This disclosure generally relates to electromagnetic radiation sensor systems and, more particularly, to active illumination systems.

BACKGROUND

An active-illumination vision system is one that emits electromagnetic radiation to illuminate a scene of interest and then senses portions of the emitted radiation that are returned from the scene to produce an image or data about the scene. Active illumination is known for certain applications, for instance, in 1D sensors or 2D and 3D imaging. For example, some night vision devices use active infrared illumination of spectral range 700-1,000 nm (just below the visible spectrum of the human eye) with CCD cameras sensitive to this light. The imaged scene, which may appear completely dark to an unaided human observer, may be captured by the device to appear as a monochrome image on a normal display.

LIDAR (Light Detection and Ranging) is another known technology that relies on active illumination techniques. Generally, LIDAR is a method that measures distances to targets by illuminating the targets with laser light and then measuring the reflected or returned laser light with a sensor. The returned portions of the laser light can be used to make digital 3D representations or images of the target scene. LIDAR is becoming an increasingly important, enabling technology for autonomous vehicles. Another known application of active illumination techniques is video gaming. The Kinect device from Microsoft uses active illumination techniques to sense the player environment.

Active illumination devices may interfere with one another. For example, active illumination devices in close proximity to each other may emit illumination signals that interfere with other devices. Other light sources, for example, extraneous sources such as lighting, headlights, lighted signs, street lights, or the like may also emit radiation that interferes with active illumination devices. Thus, there is a need for techniques to reduce such interference.

SUMMARY

As active illumination systems become more commonplace, for example, as sensors on autonomous vehicles, the opportunity for them to interfere with each other's proper functioning will increase substantially. For example, the illumination source of one system may emit electromagnetic radiation that is detected by the sensor of another system, causing erroneous readings in that system. This problem may become exacerbated because some active illumination systems that are likely to become popular, such as LIDAR, may have relatively bright illumination pulses and significant ranges (e.g., from about one meter to several hundred meters or more). Other systems may use a continuous wave (CW) light source, instead of pulse illumination. With either type of illumination source, active illumination systems operating within range of each other may generate false or erroneous detections, range errors, imaging errors or the like as a result of receiving extraneous illumination radiation from the other systems.

For example, illumination of a sensor by a different light source from another illumination system may interfere with the operation of the receiving sensor, e.g., by saturating the sensor, affecting shadows in the scene, or the like. Saturation of the receiving system's sensor and other effects of this interference may adversely impact the system's operation.

Other illumination sources such as artificial or natural lighting may also cause undesirable interference with an active illumination system.

To address at least the foregoing problems, disclosed herein are one or more apparatuses, systems and methods for reducing interference from external sources, such as interference between two or more active illumination devices.

A disclosed system includes a first active illumination device configured to emit a first illumination signal and a second active illumination device configured to emit a second illumination signal. The second active illumination device is also capable of detecting interference caused by the first illumination signal. As a result of detecting the interference, the second active illumination device may change the timing of the second illumination signal.

A disclosed method of reducing interference between active illumination devices includes detecting, at a first active illumination device, interference caused by an illumination signal emitted from a second active illumination device. As a result of detecting the interference caused by the illumination signal from the second active illumination device, the timing of an illumination signal of the first active illumination device is changed.

A disclosed apparatus includes an illuminator, a sensor, and a processor operatively coupled to the sensor and the illuminator. The processor is configured to detect interference caused by an external radiation source, based on one or more signals received by the sensor. The processor is also configured to change the timing of an illumination signal of its illuminator as a result of detecting the interference.

The foregoing summary does not define the limits of the appended claims. Other aspects, embodiments, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more examples of active illumination devices, and systems and methods of reducing interference experienced by such devices. These examples, offered not to limit but only to exemplify and teach embodiments of the invention(s), are shown and described in sufficient detail to enable those skilled in the art to practice what is claimed. Thus, where appropriate to avoid obscuring the invention, the description may omit certain information known to those of skill in the art. The descriptions herein provide examples that should not be read to unduly limit the scope of any patent claims that may eventual be granted based on this application.

The word "exemplary" is used throughout this application to mean "serving as an example, instance, or illustration." Any system, method, device, technique, feature or the like described herein as "exemplary" is not necessarily to be construed as preferred or advantageous over other features.

As used in this specification and the appended claims, the singular forms "a," "an," and "the" include plural referents unless the content clearly dictates otherwise.

Although any components, methods, devices, and systems similar or equivalent to those described herein can be used in the practice of the invention(s), specific examples of appropriate components, methods, devices and systems are described herein.

Also, the use of "or" means "and/or" unless stated otherwise. Similarly, "comprise," "comprises," "comprising" "include," "includes," and "including" are interchangeable and not intended to be limiting.

Figure 1:
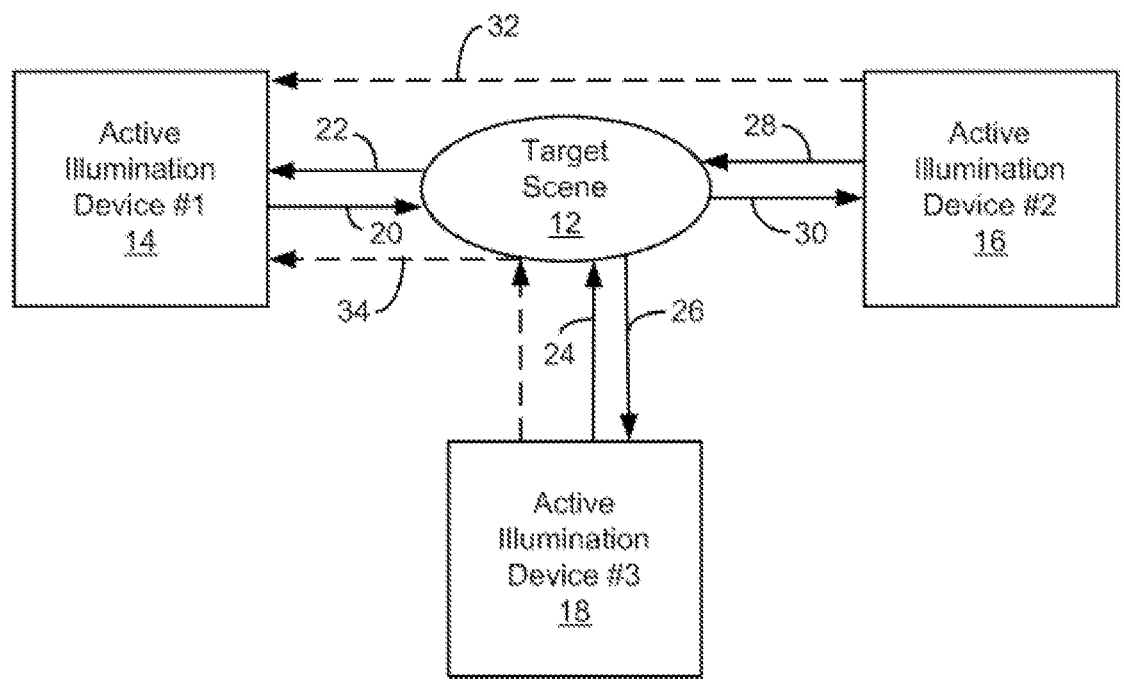
FIG. 1 is a schematic diagram illustrating an example operational environment where active illumination devices interfere with one another.

FIG. 1 is a conceptual schematic diagram illustrating an example operational environment 10 where three active illumination devices 14, 16, 18 may interfere with one another. Each of the devices 14, 16, 18 uses an illumination source, e.g., a laser or other light source, to illuminate a region of interest or target scene 12. The illumination signal emitted from the first device (illumination device #1) 14 is depicted as ray 20; the illumination signal emitted from the second device (illumination device #2) 16 is depicted as ray 28; and the illumination signal emitted from the third device (illumination device #3) 18 is depicted as ray 24. Each of the devices 14, 16, 18 also includes a camera or sensor (not shown in FIG. 1) to scan or acquire the images of and/or other information regarding the scene 12 based on returned portions of their respective illumination signals (the returned portions are depicted as return rays 22, 26, 30 in FIG. 1, respectively) that are reflected or scattered back to the devices 14, 16, 18.

The illumination sources included in the devices 14, 16, 18 and the characteristics of their emitted radiation can be any suitable type, including those sources described in greater detail herein below. Each of the devices 14, 16, 18 may be configured so that the peak energy of its illumination source ensures that the returns from a highly reflective surface in the scene 12 at minimum range or from a low reflectivity surface at maximum range within the scene 12 fall within the dynamic range of the sensor within the respective device.

However, the reflected or scattered illumination signal from the scene or a portion of the scene 12 caused by a different source from another device or light source external to the receiving device, or the direct illumination of the sensor by a different external light source, such as the illuminator of a different device, may interfere with the operation of a receiving sensor.

Examples of these types of interference are shown in FIG. 1. For instance, FIG. 1 shows illumination devices #2 16 and #3 18 emitting illumination signals 24, 28, respectively, that may be received by and interfere with illumination device #1 14, at least in part. Ray 32 represents the illumination signal 28 or portion thereof emitted by the second device 16 that reaches the sensor of the first device 14. Ray 32 depicts an example where the illumination signal 28 from device #2 16 or a portion of that signal directly impinges on the sensor of device #1 14, which may interfere with the operation of device #1 14. Ray 34 depicts another interference example, where the illumination signal 24 from device #3 18 is reflected or scattered from objects in the scene 12 so that at least some of the reflected or scattered illumination signal 24 (depicted by ray 34) impinges on the sensor of device #1 14. Ray 34 represents the illumination signal 24 or portion thereof emitted by the third device 18 that reaches the sensor of the first device 14. The external illumination signal 34 may interfere with the operation of device #1 14. FIG. 1 depicts one exemplary scenario of interference between active illumination devices. Other interference scenarios are possible and may occur.

The extraneous illumination signals from other active illumination devices and/or other external source may interfere with the receiving device (e.g., active illumination device #1 14 of FIG. 1) in various ways. For example, the illumination signal from an external source or illumination device may saturate the receiving sensor of another imaging device, affect the shadows in a scene, causes range detection errors, imaging errors, or the like in the receiving device. Saturation of the receiving device's sensor(s) and other effects of this interference may adversely impact the receiving device's operation. Thus, the systems, apparatuses, and methods disclosed herein reduce the likelihood of interference with the device sensor(s) and operation by external illumination sources.

The target scene 12 may be any area or volume of interest and may include one or more objects that may be detected and/or imaged by the active illumination devices 14, 16, 18. For example, the target scene 12 may be a room, a view from a vehicle, for example, one moving down a roadway, track or other path, any other view, or the like.

The active illumination devices 14, 16, 18 may be any suitable illumination devices, such as scanning or flash LIDAR devices, including any of the imaging devices or systems disclosed herein, or the like. One or more of the active illumination devices 14, 16, 18 may be configured to include any of the interference reduction methods, apparatuses and/or techniques disclosed herein. Although three devices 14, 16, 18 are shown in the example environment 10, the interference reduction techniques disclosed herein may be applied to environments including any suitable number of devices, such as systems including more or less than three active illumination devices. The devices 14, 16, 18 themselves may all be of the same type of device (homogeneous operating environment) or may be different types of active illumination devices (e.g., LIDAR and night vision devices) operating within range of each other so that they actually or potentially interfere with one another.

Although not shown in FIG. 1, other sources of interference may exist in the environment 10, such as radiation emitters from different sources, such as artificial lighting (e.g., signage) or the like. The interference reduction techniques disclosed herein may be applied in some circumstances to reduce or eliminate the negative effects that may be caused by these other sources of interference.

Figure 2:
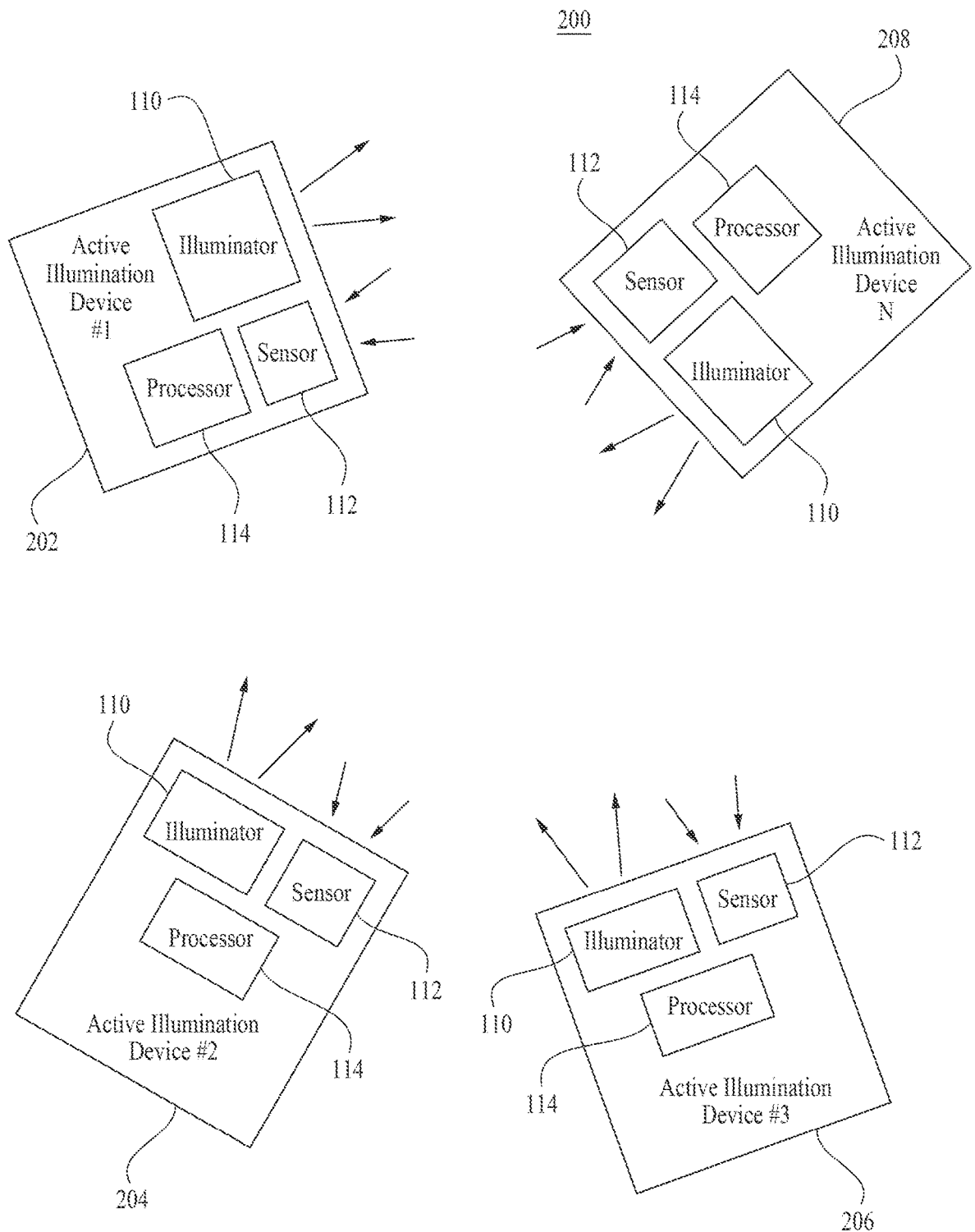
FIG. 2 is a schematic diagram illustrating another example system where active illumination devices are configured to autonomously reduce illuminator interference.

FIG. 2 is a schematic diagram illustrating an example system 200 where a plurality of active illumination devices 202, 204, 206, 208 are configured to autonomously reduce interference from external sources, such as other devices emitting interfering illumination signals. The active illumination devices 202, 204, 206, 208 may be any suitable active illumination devices, such as scanning or flash LIDAR devices, including any of the imaging devices or systems disclosed herein, or the like. Although four devices 202, 204, 206, 208 are shown in the example environment 200, the interference reduction techniques disclosed herein may be applied to environments including any number of devices, such as more than four or less than four devices.

In the system 200 the devices 202-208 are autonomous in that they may act independently of one another to reduce interference from illumination emitted by external sources, i.e., sources not included in the receiving device. They may each reduce interference by including any of the interference reduction methods and/or systems disclosed herein.

The devices 202, 204, 206, 208 themselves may all be of the same type of device (homogeneous operating environment) or may be different types of active illumination devices (e.g., LIDAR and night vision devices) operating within range of each other so that they actually or potentially interfere with one another. Each of the devices 202-208 may be configured to capture 1D, 2D or 3D images. For example, a 1D device may be a line scanner, a 2D device may be a 2D optical scanner or a 2D optomechanical spot scanner, such as a 2D LIDAR scanner. Specific examples of certain 3D imaging systems that may be used for any of the devices 202-208 are described herein in greater detail below with reference to other figures.

Each of the devices 202-208 may include a body in which its various components are mounted. The body may further include a protective cover, not shown. The particular form of each device 202-208 may vary depending on the desired performance parameters and intended application. For example, the device may be sufficiently small and light as to be worn by a person, held by a single hand, similar to a camcorder. Alternatively, the device may be configured with a larger or smaller form factor. For example, the device may be configured to mount on vehicles, such as motor vehicles, robots, or the like.

As shown in the example system 200, each device 202, 204, 206, 208 includes an illuminator 110, a sensor 112 and a processor 114. Other components (not shown) may be included in the devices 202-208.

The illuminator 110 is configured to illuminate a scene with a predefined electromagnetic signal, for example, one or more light pulses, or alternatively, constant light illumination. The illuminator 110 may be any suitable light source, such as one or more lasers, light emitting diodes (LEDs), vertical cavity surface emitting laser (VCSELs), strobe lights, or the like, but not limited thereto. The illuminator 110 may be configured to generate one or more light pulses (e.g., laser pulses). Any suitable light pulse can be used that has a duration smaller than or corresponding the exposure time of the sensor 112 in the device. For example, for 3D imaging or range detection applications the emitted light pulses may each be about 100 ns (±50 ns) or less than 100 ns in duration. E.g., each light pulse may have a relatively short duration such as a duration of 2 nanoseconds or less, for example, between 1 nanosecond and 50 picoseconds.

Other pulse durations may be used depending on the application, such as longer pulses in the microsecond range. For other imaging applications, a pulse width of 10 s of microseconds may be used. For some applications the pulse duration may be on the order of a frame period, e.g., 33 ms (the standard frame time of a camera operating at 30 frames/second).

Any suitable portion of the electromagnetic spectrum can be used for the illumination, for example, the emitted electromagnetic radiation signal may be radio frequency, visible light, infrared, ultraviolet radiation, any overlap of these spectrums, or the like. Also, the spectral bandwidth of the light used for the pulses can be any suitable value, depending on the application. For some imaging applications, the spectral bandwidth may be a few nanometers to allow for a spectral filter to be used in the sensor 112. For example, the light pulse bandwidth may be about 4 nm, centered at a frequency of about 810 nm. In some applications, e.g., indoor usage of the system 200, the spectral bandwidth of the illuminator 110 may be configured so that it does not coincide or has less overlap with some of the typical output spectrums of artificial light sources such as fluorescent lights and LED lighting.

For example, the illuminator 110 may include any of the compact illuminators and/or driver circuitry disclosed in co-pending U.S. patent application Ser. No. 15/845,719, entitled "Driver Circuit Usable for Supplying Pulsed Light Source," filed on Dec. 18, 2017, which is hereby incorporated by reference as though fully set forth herein in its entirety.

The sensor 112 may be any suitable sensor subsystem for generating one or more digital images or range detections based on light it receives from a scene. For example, any of the 3D sensor systems described herein with reference to the other figures may be included in the sensor 112. The incoming light may include ambient light, extraneous illumination signals, and/or returned light pulse portions from the device's own emissions that are collected by the sensor 112. The generated images may contain positional information about objects in a scene. The sensor 112 may utilize one or more focal plane arrays (FPAs) to obtain an image which provides one or more signals in response to received light illumination that is then digitized. The FPAs may each include an array of one or more light-detecting elements, or pixels, positioned at a focal plane of Rx optics that may be included in the sensor 112 that image a scene. Each pixel of the FPA determines an illumination intensity signal that indicates the intensity of light received by the pixel.

The sensor 112 may include one or more off-the-shelf CCD or CMOS imaging sensors as the FPA(s). In particular, such sensors may be readily commercially available for visible-wavelength applications, and require no significant modification for use in the devices 202-208. In one example, sensor 112 is a commercially purchased CMOS sensor from Sony Corporation having megapixel resolution. Some sensors for use in near-infrared applications are commercially available, albeit at substantially greater cost than the ubiquitous visible-wavelength sensors, and others are currently being developed. It is anticipated that any of a type of optical sensor, including those yet to be invented, may be used successfully with the systems disclosed herein. Generally, the image sensor 112 includes an array of pixels, where each pixel can determine the intensity of received light thereon. An image sensor array may include any suitable number of pixels, and contemporary sensors often include millions of pixels. The performance of the image sensor 112 may be characterized by a frame rate, which is how many times the pixel array of the sensor 112 may be read per second; and also characterized by a frame time, which is the amount of time it takes to read the pixel array.

The processor 114 includes a processor coupled to a memory (not shown). The processor 114 receives digital image data from the sensor 112, and may store the image data in the memory and perform processing on the image data to detect interference, among other things. The processor 114 may further control and coordinate the operation of illuminator 110 and sensor 112, as described herein. For example, the processor 114 may be programmed to adjust the timing of the detection window of the device to reduce interference from one or more extraneous illumination sources. This may be accomplished by adjusting the timing of subsequent light pulses emitted from the device's illuminator 110 and adjusting the device's sensing window of its sensor 112.

The image signals from the sensor may be processed by the processor 114 running software to determine time-of-flight information, which can then be used to determine z-axis information to produce a 3D image of the scene, as described in connection with FIGS. 9-14 herein.

The functions of the processor 114 may be implemented in hardware, software, firmware, or any suitable combination thereof. If implemented in software, the functions may be stored as one or more instructions or code on a computer-readable medium (e.g., a memory) and executed by a hardware-based processing unit (e.g., one or more microprocessors). Computer-readable media may include any computer-readable storage media, including data storage media, which may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disc storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The processor 114 may include one or more processors for executing instructions or code, such as one or more digital signal processors (DSPs), general purpose microprocessors, application specific integrated circuits (ASICs), field programmable logic arrays (FPGAs), or other equivalent integrated or discrete logic circuitry. Memory and the processor(s) may be combined as a single chip. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits, including logic circuits and/or logic elements.

Figure 3:
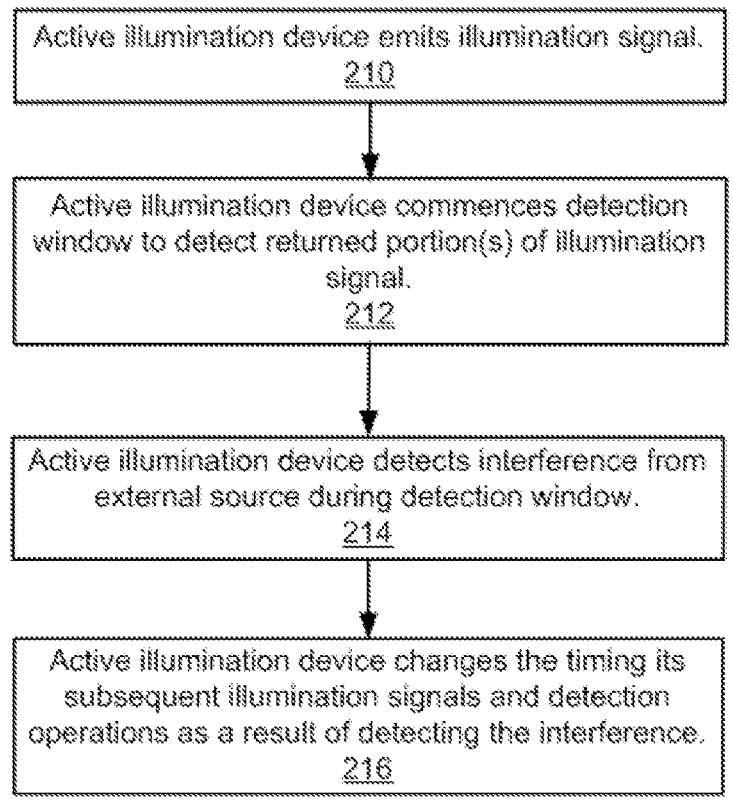
FIG. 3 is a flowchart diagram illustrating an exemplary method of reducing interference in an active illumination device.

FIG. 3 is a flowchart diagram illustrating an exemplary method of reducing interference in an active illumination device. Any of the active illumination devices, cameras, or systems disclosed herein can be programmed or configured to perform the method, including but not limited to those disclosed herein in connection with FIGS. 1, 2, 5, 8-14. The method proceeds as follows.

In step 210, an active illumination device emits an illumination signal. The illumination signal may be any of those disclosed herein, including a single pulse or alternatively, a sequence of multiple pulses. In one embodiment, the devices in a system of devices (e.g., devices 204-208) may be configured such that they emit illumination signals regularly during predefined time slots. Thus, each device emits and detects a signal during a repeating, regularly occurring time slot. In some embodiments, the emitted signal is a single pulse. In other embodiments, the emitted signal can be multiple pulses. Each device in such a system may be configured to select a random time slot upon operational startup. This may be done by a randomizing function performed by each of the devices 204-208. The randomizing function may operate on the device's serial number or other unique value associated with the device. The randomizing function may be performed by the processor 114. After the time slot is selected, the device may emit and detect its illuminations signals at regular intervals corresponding to the time slot, until it detects an interfering illumination signal.

Next, in step 212, the active illumination device commences a detection window to detect one or more returned portions of the emitted illumination signal. The detection window may be a period of time subsequent to the emission of the illumination signal during which the device anticipates arrival of any relevant returned portions of the illumination signal. During the detection window, the device's sensor(s) may be actively sensing incoming radiation at the device. A detection window may be associated with a corresponding time slot. The duration of the window can be a predefined amount of time, or it can be variably adjusted. For example, the duration of the window may equal to or proportional to the illumination pulse duration or the duration or a series of illumination pulses.

In step 214, the device determines whether it has detected incoming interference signals during the detection window time period. The interference may be detected by sampling one or more pixels from the sensor during or shortly after the detection window and determining that their intensities are above a predefined range or value. For example, the interference detection operation may be performed by the device processor analyzing image pixel data that it reads from the sensor. For instance, the processor can be programmed to look for abnormally bright spots in the image data. Such bright spots may correspond to interfering illumination signals emitted from other devices or sources (other source may be, for example, artificial lights sources such as signs or street lights). Such interfering signals may appear as point sources, analogous to looking at a flashlight. In this case, the processor may be configured to detect regions of adjacent pixels where each pixel, or a certain number of them, exceeds an intensity threshold. The detected pixel region size may also be compared to a threshold adjacent pixel number, e.g., adjacent pixel count, in order to determine whether there is an interfering illumination source based on the size of the overly bright pixel region. Thus, in some configurations of the device, the interference may be detected based on the presence of one or more bright spots, or in other configurations, based on both the presence of one or more bright spots and their respective sizes.

If no interfering illumination is detected, the device continues it emission and detection operations at regular intervals according to the selected time slot. However, if interference is detected, the device alters the timing of emitting subsequent illumination signals and its detection operations, as a result of detecting the interference during the detection window (step 216). By changing the emission and detection window timing, the device may avoid future interference from other active illumination devices. The device can adjust the illumination signal timing by selecting a different time slot (for example, by re-executing the randomization function) and adjusting the detection window according to the new time slot. Alternatively, a new time slot may be selected by offsetting the current time slot by a predefined amount of time. The method step 210-216 may then be repeated, and if the interference persists, the timing of the time slot and detection window may be again adjusted until the interference is reduced to an acceptable level.

The foregoing steps 210-216 may be repeatedly performed by each device during its operation for continuous detection and interference reduction operation.

In some embodiments, the device may be configured to detect interference without first emitting its own illumination pulse. In this case, the device may be configured to detect interference using the methods of step 214, for example, to detect a bright spot in its field of view. Then, the device may activate a detection window (e.g., step 212) with the illumination pulse turned off to confirm that the interference is still present (e.g., by performing step 214 again). If the interference is still present, the device may adjust its timing (step 216).

In a system where the active illumination devices are each associated with a time slot, the foregoing method effectively provides a technique of collision avoidance for the illumination/detection operations of the devices in the system.

Figure 4:
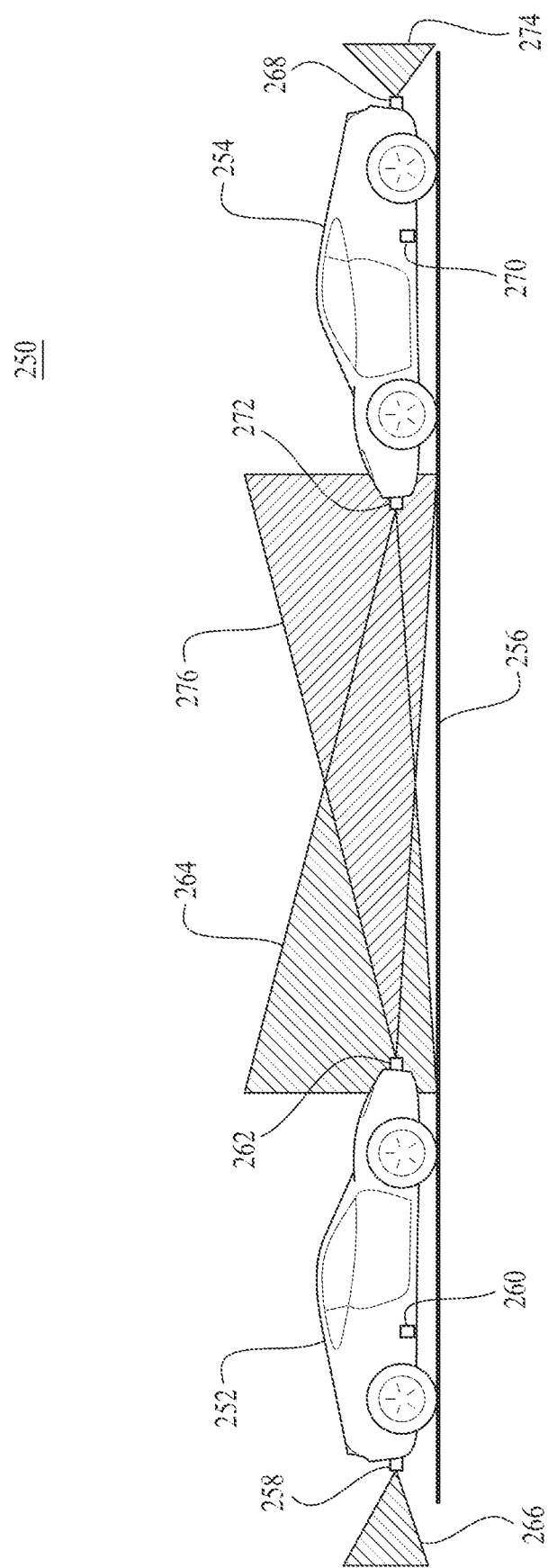
FIG. 4 is exemplary automotive operational environment where active illumination devices mounted on vehicles may interfere with each another.

FIG. 4 is exemplary automotive operational environment 250 where active illumination devices mounted on vehicles 252, 254 may interfere with each another. In the example, a first vehicle 252 has at least one active illumination device 258, 260, 262 mounted on each side of the vehicle 252—front, back, passenger's and driver's sides. A second vehicle 254 also has at least one active illumination device 268, 270, 272 mounted on each side of the vehicle 254—front, back, passenger's and driver's sides. The vehicles 252, 254 are travels toward each other on a roadway 256. In the example shown, illumination signals 276 from the front mounted active illumination device 262 of the first vehicle 252 may interfere with the operation of one or more of the active illumination devices 268, 270, 272 of the second vehicle 254 (e.g., the figure illustrates interference with the front mounted active illumination device 262 of the second vehicle 254). Likewise, illumination signals 264, 274 from the active illumination devices 268, 270, 272 mounted on the second vehicle 254 may interfere with the operation of one or more of the active illumination devices 268, 270, 272 of the first vehicle 252. For example, the figure shows the illumination signal 264 from the front mounted active illumination device 272 of the second vehicle 254 interfering with the front mounted active illumination device 262 of the first vehicle 260.

The active illumination devices mounted on vehicles 252, 254 may be any of those disclosed herein, and at least some of the active illumination devices on the vehicles 252, 254 may be configured to employ the illumination interference reduction/elimination methods and systems described herein. Upon detecting interference from one or more external sources (including other devices), any of the active illumination devices mounted to the vehicles and so configured may adjust their illumination/detection timing to reduce or eliminate the interference.

Figure 5:
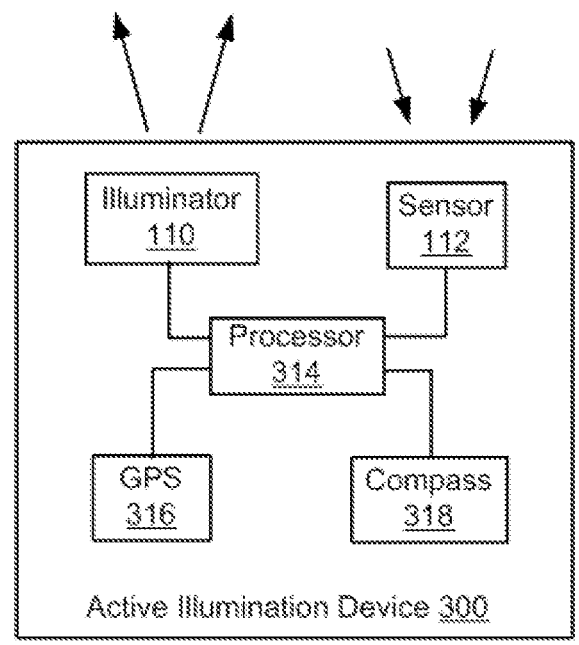
FIG. 5 is a schematic diagram illustrating certain components of an exemplary embodiment of an active illumination device.

FIG. 5 is a schematic diagram illustrating certain components of another exemplary embodiment of an active illumination device 300. The device 300 can be employed in any of the systems 10, 200, 250, 400 disclosed herein. The device 300 includes the illuminator 110, the sensor 112, a processor 314, a global positioning system (GPS) module 316, and a compass 318. The device 300 differs from devices 202-208 described in connection with FIG. 2 primarily in that the device 300 includes components for sensing the location and motion of the device 300, i.e., the GPS module 316, compass 318 and processor 314 configured to read and process information from the GPS module 316 and compass 318, as well as perform any of the interference reduction/elimination functions described herein, among other things. Other components (not shown for simplicity) may be included in device 300.

The active illumination device 300 may be any suitable active illumination device, such as a scanning or flash LIDAR device, including any of the imaging devices or systems disclosed herein, or the like. The device 300 may be configured to capture 1D, 2D or 3D images. Specific examples of certain 3D imaging systems that may include the functions and components of device 300 are described herein in greater detail below with reference to other figures.

The device 300 may be autonomous in that it may act independently of other devices to reduce interference from illumination emitted by external sources, i.e., sources not included in the receiving device. In some embodiments, the device 300 may include a radio frequency interface (discussed further in connection with FIG. 8) so that it may function in a non-autonomous, centrally controlled system, such as that shown in FIG. 8. The particular form of the device 300 may vary depending on the desired performance parameters and intended application. For example, the device 300 may be sufficiently small and light as to be worn by a person, held by a single hand, similar to a camcorder or smart phone. Alternatively, the device may be configured with a larger or smaller form factor. For example, the device 300 may be configured to mount on vehicles, such as motor vehicles, robots, or the like.

As previously discussed in connection with FIGS. 1-2, the illuminator 110 may emit an electromagnetic radiation signal as an illumination signal to illuminate a desired region of interest or scene. For example, the illuminator 110 may be a laser configure to emit a pulse of laser light. The laser pulse may have any suitable duration and energy level, for example any of those described herein with respect to the other figures. For instance, the pulse duration may be in the range between 10 nS and 1 μS. The operation and pulse timing of the illuminator 110 may be controlled by the processor 314. For example, the processor 314 may control the pulse timing using any of the interference reduction/elimination methods disclosed herein.

As discussed above in connection with FIG. 2, the sensor 112 is configured to detect electromagnetic radiation, particularly portions of the illumination signal from the illuminator 112 that are reflected or scattered back to the device 300 from a target scene. The sensor 112 may be an off-the-shelf CCD or CMOS imaging sensor. In particular, such sensors may be readily commercially available for visible-wavelength applications, and in some embodiments require no significant modification for use in the device 300. The exposure times and integration periods of the sensor 312 may be controlled by the processor 314. More than one sensor may be included in the device 300.

The GPS module 316 is configured to identify the position and/or attitude of device 300 as the device obtains images or data representations of target scenes, and to provide such information to the processor 314 to be stored with the corresponding scene images or data. More importantly, the GPS module 316 derives a uniform clock from the GPS system that can be used by the processor 314 to determine time slots and adjusting the timing of illumination pulses emitted by the device 300 and their respective detection windows. The GPS module 316 may be a commercially available component that is interfaced to and controlled by the processor 314.

The compass 318 may be a magnetic compass that is controlled by the processor 314. The processor 314 may be configured to obtain current heading data from the compass 318 that indicates the direction of travel of the device 300. The compass 318 may be a commercially available chip or module capable of being interfaced to the processor 314.

The processor 314 controls the overall operations of the device 300. The processor 314 may have a structure and functionality similar to that of processor 114 described in connection with FIG. 2. However, the processor 314 is also configured to interface to and process data from the GPS module 316 and compass 318.

Figure 6:
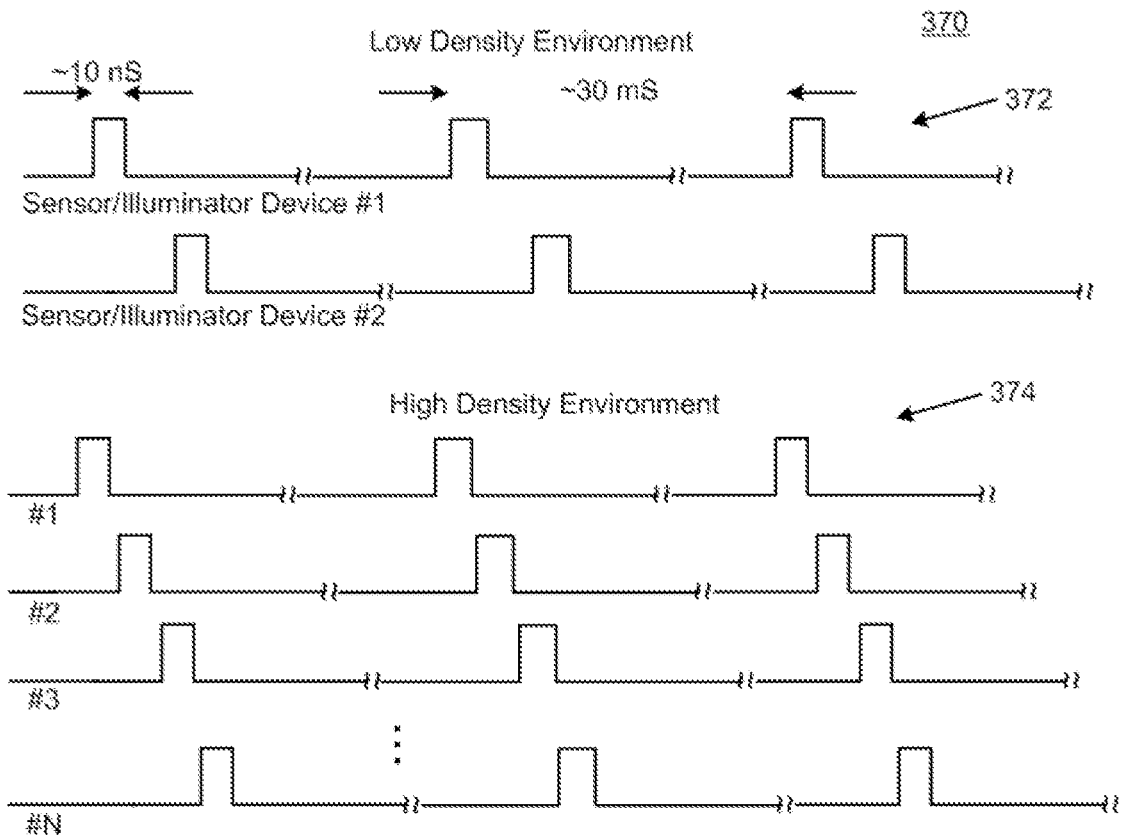
FIG. 6 is an example timing diagram illustrating illumination pulses for low and high-density environments.

FIG. 6 is an example timing diagram 370 illustrating illumination pulses for both low-density 372 and high-density operating environments 374. The pulses may be generated by any of the active illumination devices or systems disclosed herein. The illumination pulses are relatively short—typically less than one microsecond. In the example shown, the illumination pulses are about 10 nS. The illumination pulse may be repeated at a periodic rate determined by the system's operation, for example, between a rate 1-120 pulses per second. In the example shown, the pulse repetition period of the pulses is about 30 mS, or a frequency of about 33 Hz. Thus, the illumination duty cycle for each active illumination device is small, on the order of 0.01%.

In a low-density environment where there are few active illumination devices within range of each other, there are significant empty gaps between a device's illumination pulses, resulting in a low probability of simultaneous or overlapping illumination pulses from different devices. Examples of low density environments include automotive traffic situations where active illumination devices are mounted on cars travelling along lightly used surface streets. The example timing diagram 372 for the low-density environment shows the pulse timing of two active illumination devices.

As the number of active illumination devices in an environment increases, their usage density may increase to create a high-density operational environment 374. In these environments, a relatively large number of active illumination devices may be operating within range of each other. The unused times between illumination pulses decreases, and thus, the likelihood of interference from external illuminators grows in the region of interest or target scene. Examples of high density environments include automotive traffic situations where active illumination devices are mounted on cars travelling in traffic congestion, for example, in cities, at clover-leafs on busy multi-lane freeways, or the like.

Some embodiments may include one or more active illumination devices that emit a single illumination pulse corresponding to each detection window.

Additionally/alternatively, in some embodiments multi-pulse illumination methods and/or techniques may be used by one or more devices, such as those methods and techniques disclosed in U.S. patent application Ser. No. 15/857,416, filed Dec. 28, 2017, which is incorporated by reference herein in its entirety. In multi-pulse active illumination devices, two or more illumination pulses are emitted for every detection window. The interference reduction/eliminate methods and apparatuses disclosed herein may be applied to such multi-pulse active illumination devices, such as those described in U.S. patent application Ser. No. 15/857,416.

Figure 7:
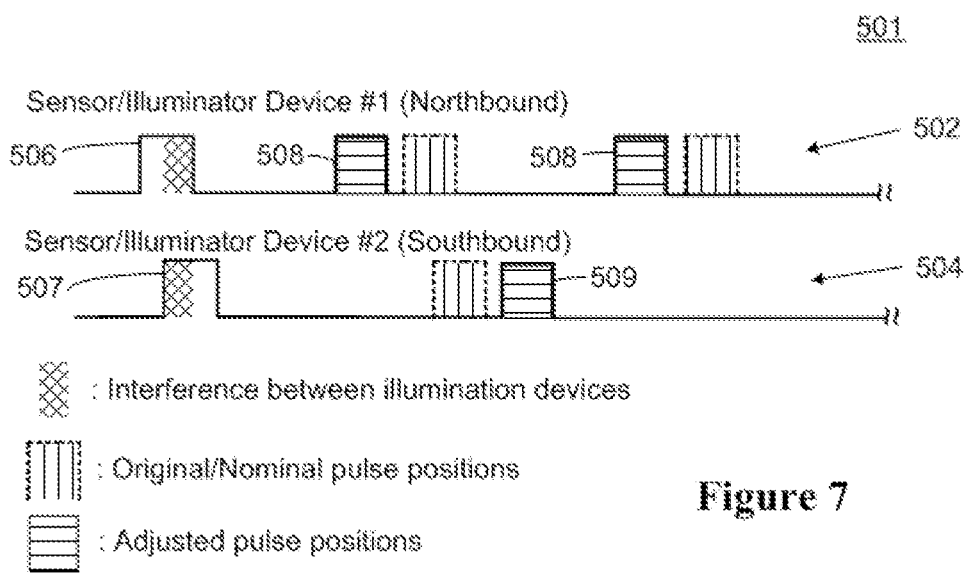
FIG. 7 is an example timing diagram illustrating illumination pulse adjustments in the event of interference between active illumination devices.

FIG. 7 is an example timing diagram 501 illustrating illumination pulse adjustments in the event of interference between active illumination devices. Each of the active illumination devices may be configured to detect an interference event, and then make adjustments in the timing of its next and subsequent illumination pulses, thus reducing the probability of an interference event occurring during the next illumination pulse.

In the diagram 501, the illumination pulse timing of a northbound active illumination device #1 is shown by timeline 502. The illumination pulse timing of a southbound active illumination device #2 is shown by timeline 504. The timelines 502, 504 illustrate a first illumination pulse 506 emitted by the northbound device overlapping in time with a first illumination pulse 507 of the southbound device. Such overlap may cause illuminator interference between the northbound and southbound device. Such interference is referred to an interference event.

An active illumination device may be configured to determine the occurrence of an interference event by reading one or more intensity values of sensor pixels included in the active illumination device and then comparing each of the intensity values to a threshold intensity value, as discussed above in connection with the method of FIG. 3. If the number of pixels with intensity values exceeding the intensity threshold exceeds a predefined pixel count, then the active illumination device declares an interference event.

The pixel count is a number that indicates that the intensity values for a certain number of the sensor's pixels are outside of an acceptable range, e.g., the pixels are saturated. As discussed above in connection with FIG. 3, the method may be configured to identify localized regions of pixels having excessive intensities in order to recognize an interference event.

Upon detecting an interference event, the active illumination device then applies an algorithm suitable for either the clocked, non-autonomous system 400 or unsynchronized, autonomous system 200 in order to adjust the pulse/sense timing of the affected active illumination device so as to reduce the probability of a subsequent interference event and eliminate or reduce the interference.

If operating in an unsynchronized, autonomous system, the active illumination device experiencing the interference event may adjust the start time for every pulse following an interference event by a random amount of time. The amount of the time adjustment may be determined by using randomizing function to result in an adjustment, for example, over a range of ±5% of the pulse repetition period.

If the active illumination devices are operating in a clocked, non-autonomous system, the affected active illumination device may select a slot or time at random using a randomizing function operating on its serial number or other unique value associated with the device. The device may alternatively be assigned a new unoccupied time slot by the system controller.

In the example shown in diagram 501, the northbound device, upon detecting an interference event caused by the southbound device's illuminator, advances its illumination pulse timing so that its next emitted pulse 508 occurs slightly before its original periodic start time. The northbound device then continues emitting regular illumination pulses using the adjusted timing, unless another interference event occurs. The southbound device, upon detecting an interference event caused by the northbound device's illuminator, delays its illumination pulse timing so that its next emitted pulse 509 occurs slightly after its original periodic start time. The southbound device then continues emitting regular illumination pulses using the adjusted timing, unless another interference event occurs.

In some configurations, the active illumination device may include a magnetic compass (see, e.g., FIG. 5 device 300) and make use of the compass to determine how the timing of the next illumination pulse should be adjusted. For example, following detection of an interference event, the device, through operations performed by its processor, may adjust its illumination pulse timing based on the present direction of travel of the device, as determined from compass readings. The 360° range of a compass reading can be partitioned into multiple sections. Each section represents a subset of travel directions. Each section may have assigned to it a predefined scheme for adjusting illumination pulse timing. If the active illumination device is travelling in a certain direction when it detects an interference event, the processor may be configured to apply the adjustment scheme designated for the section matching its direction of travel. The sections may designated any stored in memory as a lookup table corresponding to the adjustment scheme. By providing different adjustment schemes based on the direction of travel, the likelihood of a subsequent interference event is reduced even further, particularly in congested environments.

For example, by way of an illustrative example, compass headings are categorized into four sections, with each section having a different illumination pulse timing adjustment procedure. Thus, there are four different timing adjustments that can be performed by the active illumination device. Which adjustment is applied depends on the direction of travel of the device at the time the interference event occurs.

In this example, the active illumination device may be configured so that if it is moving along a direction between the northwestern heading and the northeastern heading on its compass when it detects an interference event, the device adjusts the time of its next pulse by advancing the start time of its illumination pulse by a random amount between approximately the pulse width, e.g., 10 nanoseconds plus a few percent of the frame rate, e.g., 1 millisecond for 30 frames per second (fps). If the device is instead moving in a direction between the southwestern heading and southeastern heading at the time of the interference event, the device adjusts the start time of the next pulse to be delayed by a random amount between approximately the pulse width, e.g., 10 nanoseconds plus a few percent of the frame rate, e.g. 1 millisecond for 30 fps. If the device is moving in a direction between the northwestern heading and southwestern heading when the interference event occurs, the device adjusts the time of the next illumination pulse to be delayed by a random amount between a few percent of the frame rate, e.g., 1 millisecond for 30 fps, and twice that amount, e.g., 2 milliseconds for 30 fps. If the active illumination device is moving in a direction between the northeastern heading and southeastern heading when the event occurs, the time of the next illumination pulse is advanced by a random amount between a few percent of the frame rate, e.g., 1 millisecond for 30 fps and twice that amount, e.g., 2 milliseconds for 30 fps.

An active illumination device may be configured such that other direction sections and ranges may be used, as well as other schemes for adjusting illumination pulse timing.

Figure 8:
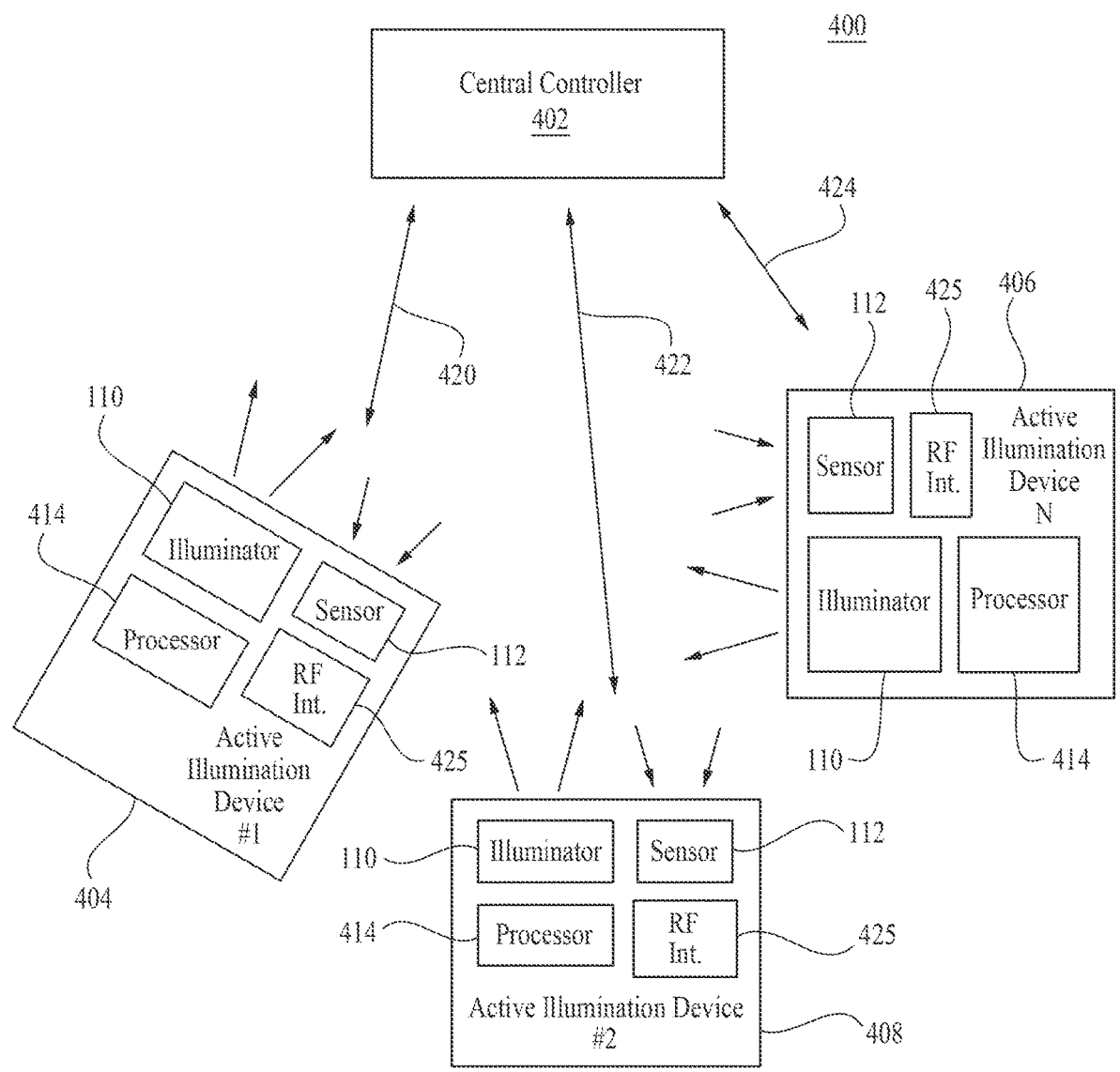
FIG. 8 is a schematic diagram illustrating another example system where active illumination devices are configured to communicate with a central controller to reduce illuminator interference.

FIG. 8 is a schematic diagram illustrating an example system 400 where active illumination devices 404, 406, 408 are configured to communicate with a central controller 402 to reduce illuminator interference. In the system 400 a source of system timing, such as the Global Positioning System (GPS) is ubiquitously available. The devices 404, 406, 408 synchronize their illumination and sensing operation to designated time slots respectively allocated to the devices 404, 406, 408 by the central controller 402. A time slot maybe be assigned to a device, or the devices may randomly access a respective time slot to allocate it to itself. The time slots may have durations and periodic spacings as described herein. Although FIG. 8 shows three devices 404-408, any suitable number of active illumination devices may be used in the system 400. The devices 404-408 communicate with the central controller 402 by way of respective wireless communication paths 420, 422, 424.

Each of the devices 404, 406, 408 may include the illuminator 110, the sensor 112, a processor 414 and a radio frequency (RF) interface 425. Although not shown, any of the devices 404-408 may also include the compass 318 and GPS module 316 with the processor 414 being configured to interface to and use data from the compass 318 and GPS module 316 in order to perform directional and/or location based timing adjustments, as discussed herein above. The processor 414 may have the same structure and functions as described for the processor 114 shown in FIG. 1, and may additionally be configured to control and transfer information to and from the central controller 402 via the RF interface 425.

The central controller 402 may be any suitable device for allocating and keeping track of time slot assignments to the devices 404-408. For example, the central controller 402 may be implemented as software running on a networked server having a database identifying time slots, their availability, and their current allocation device. The server may communicate with the devices 404-408 by way of standard cellular data infrastructure and Internet protocols.

Upon operational startup, a device may send a message to the central controller 402 requesting a time slot assignment. The device then proceeds to perform illuminate/sense operations. When the devices detects an interference event, it may communicate with the central controller 402 requesting a new time slot assignment. The central controller 402 may access its database to select and assign a new time slot to the requesting device. The controller 402 then transmits a message to the device via the wireless path. The message identifies the new time slot based on the system timing clock. The device then emits subsequent pulses using the new time slot. The interference event sensing may occur with every detection window, or alternatively, with detection windows that are spaced by a predefined number of intervening emission/detection time slots or windows.

In some configurations, time slots may be assigned to devices based on their current directions of travel. In this case, the devices may be configured to provide the direction of travel information in its time slot request to the central controller. The time slots of devices traveling in a particular direction may be assigned by the controller so that they are grouped together so that devices traveling in the opposite directions are grouped in slots away from each other, thus lessening the possibility of interference between the oppositely traveling devices. The devices may also be configured to request updated time slots when they determine that their direction of travel has changed.

Figure 9:
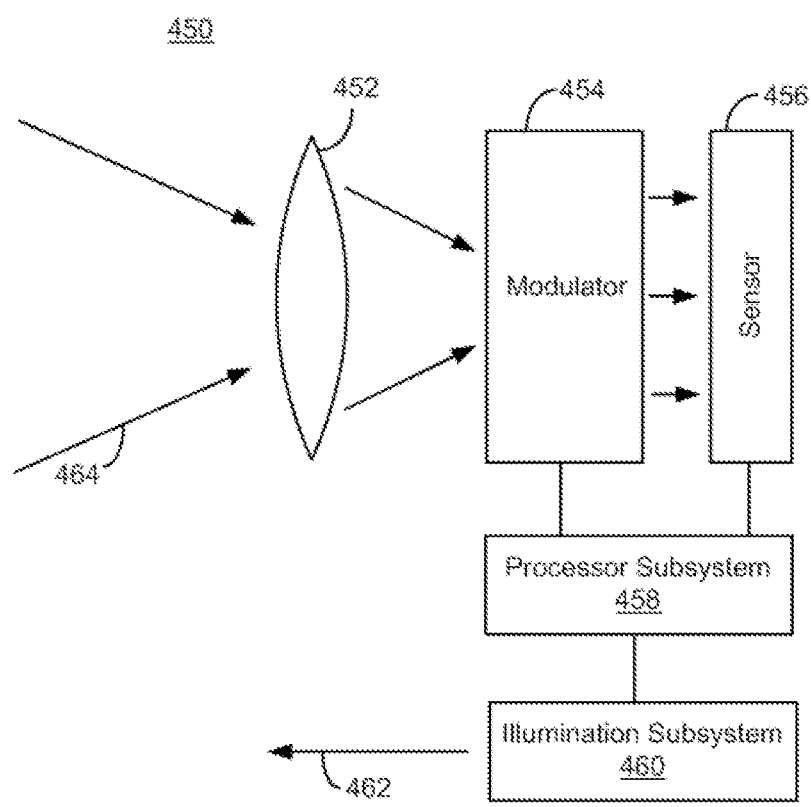
FIG. 9 schematically illustrates a first exemplary 3D imaging system that may be configured to use one or more of the disclosed techniques of interference reduction.

FIG. 9 schematically illustrates a first exemplary 3D imaging system 450 that may be configured to employ any of the disclosed techniques for reducing or eliminating interference. More specifically, the system 450 may be configured to perform any of the interference reduction/elimination methods disclosed herein, and/or may be configured to include any of the components and/or functions disclosed for devices 202, 300, 404. The system 450 may be configured to act to reduce/eliminate interference autonomously, for example, like the devices 202, 300 in an unsynchronized system. Alternatively, the system 450 may be configured to operate in a centrally controlled system, such as system 400 of FIG. 8, by including the features of device 404, for example.

The system 450 include receiving (Rx) optics 452, a modulator 454, at least one sensor 456, a processor subsystem 458, and optionally, an illumination subsystem 460. The illumination subsystem 460 may be separate from the system 450 in some configurations. The positions of Rx optics 452 and the modulator 454 may alternatively be reversed, with the Rx optics 452 following behind the modulator 454. The modulator 454 may also be integrated within the sensor 456.

Capturing the 3D position of surfaces and objects in a scene is becoming more and more commonplace for imaging applications. The system 450 can be used in applications such as robotic vision, autonomous vehicles, surveying, video game controls, visual effects, augmented-, mixed-, virtual-reality or similar, mapping, and other applications where it is useful to know coordinate or location information about areas of the real-world. The system 450 is able to capture the 3D information along with images or video in high resolution in the same way two dimensional (2D) video cameras and cell phone cameras function today. Size, weight, and power requirements for the system 450 are relevant considerations, and may depend on the application in which the system 450 is used. For example, the system 450 or any of the other systems disclosed herein may be included in a handheld device, such as a still or video camera, smartphone, or the like.

How the system 450 captures range or 3D information is generally described as follows. The illumination subsystem 460 emits an illumination pulse 462 under the control of the processor subsystem 458 for irradiating a scene. Portions of the illumination pulse 462 are returned from the scene to the system 450 where they are collected by the Rx optics 452, which passes the received light through the modulator 454. After passing through the modulator 454, the received light is the detected by the sensor 456 and then electronic pixel image data from the sensor 456 is processed by the processor 458 to extract information about the scene. Referring back to FIG. 1, objects in the scene 12 are each at different positions in the scene and also have different shapes. As such, if the 3D system 450 is used to image the scene 12, for example, different portions of the illumination pulse will travel different distances from the illumination subsystem 460 to irradiate the objects 102, as well as to irradiate different features or areas of each object individually, before the objects 102 scatter and/or reflect the pulse portions back toward system 450. As such, each of the pulse portions may have a different time-of-flight (TOF). Additionally, the reflected or scattered pulse portions have different intensities, depending on the reflectivity of the irradiated feature of each object 102, and the angle of that feature relative to system 450. The modulator 454 and sensor 456, under the control of the processor subsystem 458 are configured to determine the TOF for the received pulse portions, and thus, the range information corresponding to objects in the scene 12. Specific examples of how this may be done are described in further detail herein in connection with FIGS. 10-14

The illumination pulse 462 may be any suitable electromagnetic signal having an appropriate spectral distribution and duration for the application at hand. For example, the pulse 462 may have the characteristics described for the light pulses disclosed elsewhere herein, e.g., those described in connection with FIGS. 1-8. The illumination subsystem 460 may include the functionality and components described for the other illumination subsystems 110, 510 disclosed herein in connection with FIGS. 2 and 10, respectively. The subsystem 460 may be controlled by the processor subsystem 458 in the manners as described herein in connection with any of the other processors shown in the other figures, e.g., processors 114, 314, 414, 540, 1326.

The system 450 receives light 464, including returned portions of the light pulse 462 via the Rx optics 452. The Rx optics 452 may include the functionality and components included in the Rx optics described in connection with FIG. 10.

The modulator 454 may include an electro-optic modulator, located along an optical axis of the system 450, configured to modulate as a function of time a characteristic of the received portion of the light pulse from the scene to form a modulated light pulse portion. The modulated characteristic may include the intensity of the light, its polarization state, its refraction passing through the modulator 454, any combination or the foregoing, or the like. The modulator 454 may be located at the focal plane (image plane) of the Rx optic 452. However, in other configurations of the system 450, the modulator 454 is not located at the image plane of the Rx optics 452. The modulator 454 may include a polarization modulator, compensator(s) and/or polarizer(s), for example, as described for the systems illustrated in FIGS. 10-14 herein. The modulator 454 may be controlled via control signals from the processor subsystem 458 in the same manner as described in connection with FIG. 10.

The sensor 456 may include one or more image sensors, for example FPAs, such as any of those sensors described herein, for example, the sensors described in connection with FIG. 2, 10 or 13.

The processor subsystem 458 controls the overall operation of the system 450 and may be configured to cause the system 450 to capture 3D image data and also perform any of the interference reduction/elimination methods described herein, for example, the method described in connection with FIG. 3. For example, the processor subsystem 458 may cause the system 450 to capture actively illuminated images in accordance with the timelines 400 or 500 disclosed in connection with FIGS. 6-7. The processor subsystem 458 may include any of the functionalities and/or components included in any of the other processors or processor subsystems described herein.

Figure 10:
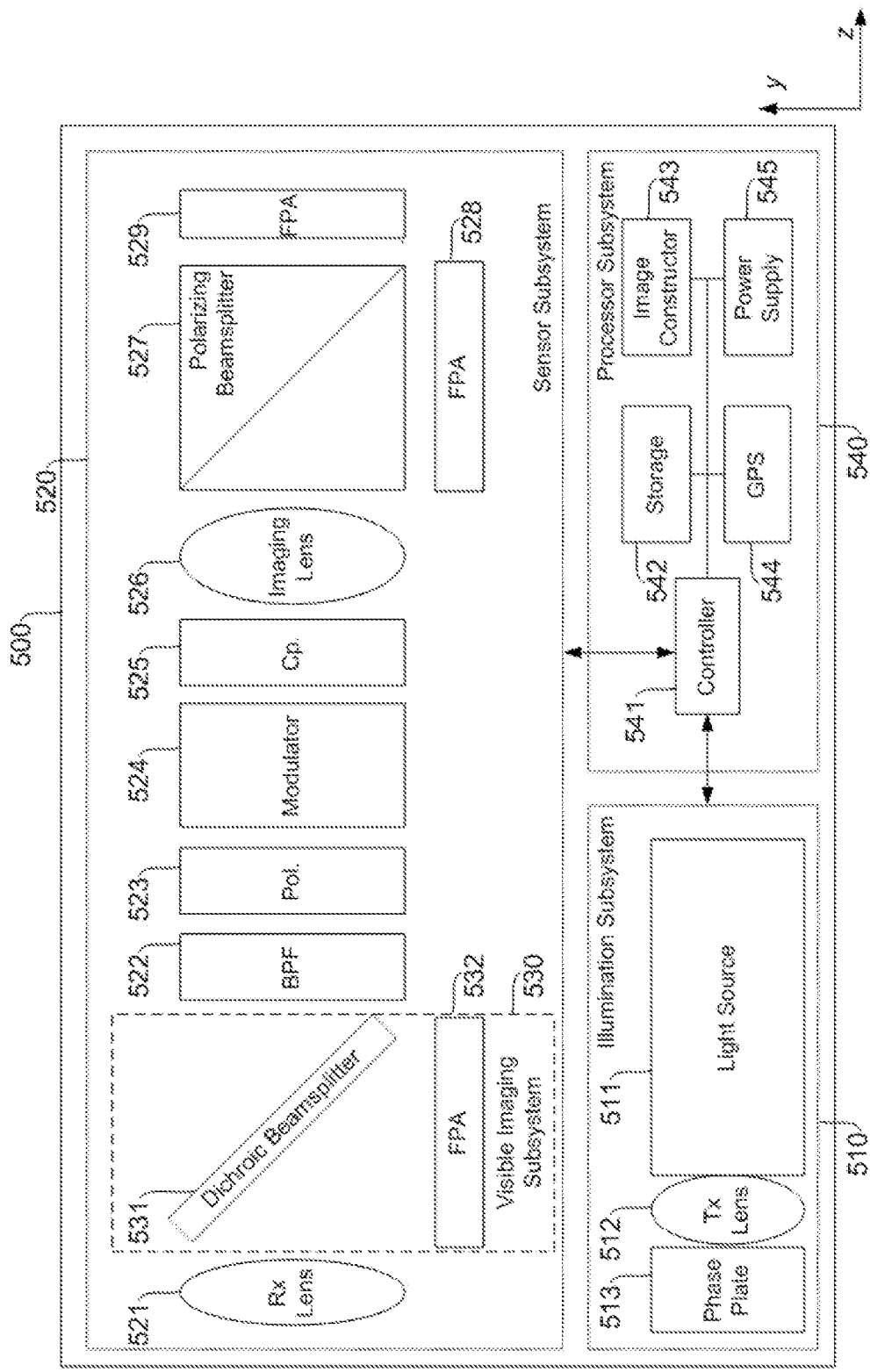
FIG. 10 schematically illustrates a second exemplary 3D imaging system that may be configured to use one or more of the disclosed techniques of interference reduction.

FIG. 10 schematically illustrates a second exemplary 3D imaging system or camera 500 capable of employing the disclosed techniques for reducing or eliminating interference. More specifically, the system 500 may be configured to perform any of the interference reduction/elimination methods disclosed herein, and/or may be configured to include any of the components and/or functions disclosed for devices 202, 300, 404. The system 500 may be configured to act to reduce/eliminate interference autonomously, for example, like the devices 202, 300 in an unsynchronized system. Alternatively, the system 500 may be configured to operate in a centrally controlled system, such as system 400 of FIG. 8, by including the features of device 404, for example.

The system 500 can be used in applications such as robotic vision, autonomous vehicles, surveying, video game controls, smartphone cameras, video or still cameras, visual effects, augmented-, mixed-, virtual-reality or similar, mapping, and other applications where it is useful to know coordinate or location information about areas of the real-world. The system 500 is able to capture the 3D information along with images or video in high resolution in the same way two dimensional (2D) video cameras and cell phone cameras function today. Size, weight, and power requirements for the system 500 are relevant considerations, and may depend on the application in which the system 500 is used.

Some of the operations and functions of the system 500 and its components are described in further detail in U.S. Pat. No. 8,471,895 B2, which is incorporated by reference in its entirety as if fully set forth herein (referred to herein as the "'895 patent"). However, the system 500 described here differs from the 3D imaging systems disclosed in the '895 patent in that it is modified to perform the method(s) disclosed herein for reducing or eliminating external interference.

It should be appreciated that the functionality of system 500 may alternatively be provided with other optical arrangements, for example as described below. As illustrated in FIG. 10, system 500 includes illumination subsystem 510, sensor subsystem 520, and processor subsystem 540. Each of these subsystems will now be described in greater detail.

The illumination subsystem 510 includes light source 511 for generating a light pulse, transmission (Tx) lens 512 for controlling the divergence of the generated light pulse, and optional phase plate or other beamshaping element 513 for enhancing the spatial profile of the light pulse. The positions of lens 512 and optional phase plate 513 may alternatively be reversed. These elements may also be combined in a single optic or set of optics. The illumination subsystem 510 may generate light pulses that are polarized or that are unpolarized, either directly or by using optics or elements to achieve the desired characteristic. Illumination subsystem 510 is in operable communication with controller 541, which may control and/or monitor the emission of light pulses from light source 511, and which further may control and/or monitor the divergence that transmission lens 512 imparts on the generated light pulse.

The illumination subsystem 510 may generate a light pulse having any suitable form of spatial and temporal profile and any suitable divergence. For example, the subsystem 510 may be configured to generate light pulses each having a smooth spatial profile, a smooth temporal profile, and a divergence of between, for example, 5 and 40 degrees, or greater than 40 degrees. The light pulse may be in any suitable portion of the electromagnetic spectrum, for example, in the visible band (e.g., 400-700 nm) or in the near-infrared band (e.g., 700 nm-2500 nm). Generally, pulses generated in specific regions of the near-infrared band are considered to be more "eye-safe" than pulses of comparable power in the visible band. Light source 511 is configured to generate a light pulse in the desired electromagnetic band, and lens 512 and optional phase plate 513 are configured to provide that light pulse with the desired divergence and optionally further to enhance the pulse's spatial profile. In some cases, light source 511 is a laser producing light pulses having at least 5 µJ energy, or at least 100 µJ energy, or at least 1 mJ energy, or at least 10 mJ energy. Such laser energies may be relatively eye-safe because of the high divergence of the laser beam. In other cases, the laser energies may be eye-safe by using Tx lens designs to achieve required safety thresholds. Or some combination of optical elements may be used to achieve eye-safety or other desired characteristic of the illumination pattern. In some configurations, the illumination pattern matches or approximately matches or is related to the field of view of the Rx lens.

A low-coherence laser that may be used as light source 511, as described in connection with FIGS. 6A-C of the '895 patent, which subject matter is expressly incorporated herein by reference. A low-coherence laser may be configured to provide high output power or energy for a relatively low cost, pulsed laser devices. Lower spatial coherence may also reduce the focusability of the laser on the retina of the eye, thereby improving eye safety. The three-dimensional imaging system 500 is an example of a wide field-of-view system in which the reduced spatial and/or temporal coherence of a laser may be useful. Such a laser source may be a solid-state laser of an appropriate design, or it may be a laser diode or laser diode array. In some configurations, the light source 511 may be a non-laser source such as light emitting diodes (LEDs). The light source 511 may be a single device or several devices that are controlled together or separately by the controller 541. The emitted patterns may overlap at various ranges from the light source 511 or may be arranged to overlap a relatively small amount or not at all as is appropriate for the system design. In some cases, the use of multiple light source or arrays of light sources may reduce intensity fluctuations or self-interference, either at the surfaces of the objects illuminated by the light source or elsewhere in the light propagation.

In some configurations, the light source 511 may include any of the compact illuminators and/or driver circuitry disclosed in co-pending U.S. patent application Ser. No. 15/845,719, entitled "Driver Circuit Usable for Supplying Pulsed Light Source," filed on Dec. 18, 2017, which is hereby incorporated by reference as though fully set forth herein in its entirety.

Illumination subsystem 510 may generate a laser pulse having a large divergence, e.g., between 1 and 180, or between 1 and 90, or between 1 and 40, or between 2 and 40, or between 5 and 40 degrees of divergence, and low spatial and/or temporal coherence, whereas a diffraction-limited laser may have a divergence of only a fraction of a degree and a large amount of spatial and temporal coherence. The large divergence and lack of spatial and/or temporal coherence may reduce the amount of intensity fluctuations in the laser irradiance at the surfaces of objects being illuminated with the laser beam. The smoother intensity profile of the laser beam generated by illumination subsystem 510 may improve the performance of sensor subsystem 520.

In some configurations, a low coherence laser may generate pulses having a wavelength of 1400 nm or greater, an energy of 40 mJ or greater, and a pulse duration of less than 100 nS, for example, about 10 nS, or less than 500 picoseconds. There are several gain media that emit in this spectral region, including Er:YAG, Cr:YAG, and Tm,Ho:YAG. For example, the material Er:YAG has been used to produce pulses at 1617 nm having 1 nanosecond pulse lengths and 0.6 mJ output at 10 kHz pulse repetition frequencies. Other material that may be used include Nd:YAG, Nd:YVO$_4$, Nd:YLF, Yb:YAG, that can operate at about 946 nm, 912 nm, 1047 nm, 1053 nm, 1046 nm, and other wavelengths and harmonics.

One or more laser diodes may also be used as the light source 511, which can operate at any suitable wavelength, for example, about 808 nm, 858 nm, 905 nm, 855 nm, 915 nm, 946 nm, 980 nm, 1400 nm, 1500 nm, 1550 nm or others. For some applications, such as underwater applications, where blue & green wavelengths are useful, shorter wavelengths may be used, e.g., about 532 nm, 515 nm, 486 nm, 455 nm, 458 nm, 473 nm, center frequencies in between the foregoing values, or the like. One or more LEDs with a similar wavelength may be used as the light source 511. Suitable combinations of the foregoing example light sources may be included in light source 511, and the light sources may have tunable center frequencies.

Referring again to FIG. 10, transmission (Tx) lens 512 may increase the divergence of the light pulse generated by light source 511 (e.g., a low coherence laser or any other suitable laser, including a high coherence laser). For example, although the light pulse from light source 511 may be relatively highly divergent compared to some previously known lasers because the pulse contains many spatially and temporally incoherent modes, the pulse's divergence may in some circumstances still remain well below 1 degree. Lens 512 may be configured to increase the divergence of the light pulse to between 5 and 40 degrees, depending on the distance of the scene from system 500 and the portion thereof to be imaged. Lens 512 may include a single lens, or may include a compound lens, or may include a plurality of lenses or mirrors, that is/are configured to increase the divergence of the pulse to the desired degree, e.g., to between 1 and 180 degrees, or 1 and 120 degrees, or 1 and 90 degrees, or 2 and 90 degrees, or 2 and 40 degrees, 5 and 40 degrees, or between 5 and 30 degrees, or between 5 and 20 degrees, or between 5 and 10 degrees, or between 10 and 40 degrees, or between 20 and 40 degrees, or between 30 and 40 degrees, or between 10 and 30 degrees, for example. Divergences larger or smaller may also be used. In some configurations, the FOV in the horizontal direction may be different from the FOV in the vertical direction. The horizontal and vertical FOVs may take any of the foregoing dimensions. In some configurations, transmission lens 512 may be adjustable, so that a user may vary the divergence of the laser pulse to suit the particular situation. Such an adjustment may be manual (similar to the manual adjustment of a "zoom" lens), or may be automated. For example, controller 541 may be operably connected to transmission lens 512 so as to automatically control the degree of divergence that lens 512 imparts to the laser pulse. Such automatic control may be responsive to user input, or may be part of an automated scene-imaging sequence.

Illumination subsystem 510 optionally may further include phase plate 513, which is configured to further smooth the top of the spatial profile of the light pulse generated by light source 511 so that the spatial profile may be closer to a rectangular shape. The phase plate 513 may also change the divergence of the light pulse or change its spatial distribution as desired. The phase plate may be any optical arrangement that achieves these objectives, such as micro-lenses, a scatter plate, diffuser, holographic plate or any suitable combination of the foregoing.

It should be noted that although illumination subsystem 510 includes light source 511, which is substantially monochromatic, it optionally may include additional types of light sources. For example, illumination subsystem 510 may include a white light source for illuminating the scene with white light. Or, for example, illumination subsystem 510 may include other substantially monochromatic light sources in spectral regions different from that emitted by light source 511. For example, where light source 511 generates laser pulses in one particular portion of the visible spectrum, such as in the green region, e.g., 532 nm, such pulses may cast that hue over the scene. In some circumstances, such as the filming of a movie, this may be undesirable. Illumination subsystem 510 may include one or more additional light sources that generate light that, when combined with the light from light source 511, result in the appearance of white light. For example, where light source 511 generates green laser pulses (e.g., 532 nm), illumination subsystem 510 optionally may further include diodes or lasers or other light sources that emit wavelengths in the red and blue regions, e.g., 620 nm and 470 nm, that, combined with the green laser pulses to produce an illumination that maintains the desired scene illumination characteristics.

The light source 511 may also have elements that emit light at different wavelengths that can be combined by optical elements. Different wavelengths may also be emitted that can be used to differentiate some types of surfaces or materials based on the spectral properties of the object materials. Multiple wavelengths from the light source 511 can also reduce spatial or temporal coherence or may smooth or change the illumination pattern as desired.

Still referring to FIG. 10, system 500 further includes the sensor subsystem 520, which may receive ambient light from a scene along with portions of the light pulse, generated by illumination subsystem 510, that are reflected and/or scattered by objects in the scene. The ambient light may be visible light from the scene, which light may be from ambient sources as described herein above.

The example sensor subsystem 520 may include receiving (Rx) lens 521, optional band-pass filter (BPF) 522, polarizer (Pol.) 523, modulator 524, optional compensator (Cp.) 525, optional imaging lens 526, polarizing beamsplitter 527, and first and second FPAs 528, 529. Sensor subsystem optionally further includes white light imaging subsystem 530, which includes an optional dichroic beamsplitter 531 and optional FPA 532. Sensor subsystem 520 is in operable communication with controller 541, which may monitor and/or control the operation of different components of the sensor subsystem 520, such as receiving lens 521, modulator 524, imaging lens 526, FPAs 528, 529, and optional FPA 532. An alternative example of sensor subsystem 520 omits imaging lens 526, visible imaging subsystem 530, dichroic beamsplitter 531, and FPA 532.

The receiving lens 521 may be a non-collimating lens that collects light from the scene and focuses it into an image, either on the FPA(s) or at an intermediate plane. As discussed above with reference to FIG. 1, the scene may scatter and/or reflect light in a variety of directions other than back toward the three-dimensional imaging system 500. Some of such light may be generated by illumination subsystem 510, while other of such light may be white light or light in a different wavelength range, which may or may not have been generated by illumination subsystem 510. The amount of light collected is proportional to the area of the receiving aperture, e.g., is proportional to the area of receiving lens 521.

To enhance the amount of light collected by sensor subsystem 520, thus increasing the amount of information that ultimately may be contained in each three-dimensional image, receiving lens 521 may be constructed to receive as much light as practicable for the given application. For example, for some applications of the imaging system, the receiving lens 521 may, for example, have a diameter of 1 to 4 inches, or 2 to 3 inches, or for example, about 2 inches, or smaller. For applications in which the imaging system is instead designed to provide high-resolution images for commercial purposes, receiving lens 521 may be made as large as practicably feasible, for example, having a diameter of 2 to 6 inches, or 2 to 4 inches, or 1 to 3 inches, or, for example, 4 inches. Smaller or larger Rx lens 521 diameters than those given above may alternatively be used. The various optical components of sensor subsystem 520 may be configured so as to avoid or reduce clipping or vignetting the light collected by receiving lens 521 using techniques known in optical design. Additionally, receiving lens 521 and the other optical components or coatings may also have a wide angular acceptance, e.g., of between 1 and 180 degrees, or between 1 and 120 degrees, or between 1 and 90 degrees, or between 2 and 40 degrees, or between 5 and 40 degrees.

Receiving lens 521 may include a single lens, or may include a compound lens, or may include a plurality of lenses or mirrors, which is/are configured to collect light from the scene and to image the collected light into an image plane at a defined position within sensor subsystem 520. Receiving lens 521 may be configured to reduce or inhibit the introduction of spherical and chromatic aberrations onto the collected light and non-collimating. In some cases, receiving lens 521 may have design elements to compensate aberrations in other elements of the sensor subsystem 520. In some cases, receiving lens 521 may include design elements to improve the depth of field of the sensor subsystem 520 or reduce its sensitivity to changes in position or to component placement or approximately relate the point spread function of the lens with FPA pixel size or other similar aspect of the sensor subsystem 520.

In some configurations of the system, receiving lens 521 may be adjustable, so that a user may choose to adjust the position of the object plane of lens 521, or the distance at which the scene is imaged to a defined plane within sensor subsystem 520. In some cases, receiving lens 521 can be adjusted to change the angular FOV. Such an adjustment may be manual (similar to the manual adjustment of a "zoom" lens), or may be automated. For example, controller 541 may be operably connected to receiving lens 521 so as to automatically control the position of the object plane of lens 521 or angular FOV of lens 521. In some cases, these adjustments may be performed in part based on the beam divergence imparted by transmission lens 512 (which also may be controlled by controller 541). Such automatic control may be responsive to user input, or may be part of an automated scene-imaging sequence, as described in greater detail below. In some cases, the beam divergence of the receiving lens 521 may be adjusted independently of the divergence from the illumination subsystem 510 or vice versa.

Sensor subsystem 520 may optionally include the imaging subsystem 530, so the light collected by receiving lens 521 is imaged at two image planes. Specifically, in this configuration, the collected light passes through dichroic beamsplitter 531, which is configured to redirect at least a portion of the collected visible light or other range of wavelengths onto FPA 532, which is positioned in the image plane of receiving lens 521. FPA 532 is configured to record a color or grey-scale image of the scene based on the visible light it receives. In some configurations, FPA 532 is substantially identical to first and second FPAs 528, 529, and is configured so that the visible light image it records is registered, either mechanically, electronically or by some other means, with the images that the first and second FPAs record. FPA 532 is in operable communication with controller 541, which obtains the image from FPA 532 and provides the obtained image to storage 542 for storage, which may be accessed by image constructor 543 to perform further processing, described in greater detail below. It should be appreciated that visible imaging subsystem 530 alternatively may be configured to obtain an image based on any other range of light, for example, any suitable broadband or multiband range(s) of light.

Alternatively, the visible imagine subsystem 530 and its associated components 531, 532 may be omitted, and instead a low cost, low resolution sensor (not shown) can be used by the system 500 to capture visible image information. Operation of the low cost sensor can be controlled by and image data processed by the controller 541. The controller 541 can also register electronically the low cost sensor image data with image data captured by FPAs 528, 529.

In the system 500 shown in FIG. 10, light that dichroic beamsplitter 531 does not redirect to FPA 532 is instead transmitted to band-pass filter (spectral filter) 522, which is configured to block light at wavelengths other than those generated by illumination subsystem 510 (e.g., has a bandwidth of ±5 nm, or ±10 nm, or ±25 nm, or asymmetric bandpasses), so that the remainder of sensor subsystem 520 receives substantially only the light emitted by illumination subsystem 510 that the scene reflects or scatters back towards system 500 (e.g., pulse portions 127, 128, 129 illustrated in FIG. 1 of the '895 patent) and ambient background light in the same frequency band. Other spectral filters may be included. The spectral filter 522 and any others included may each be a separate optical elements or a coating. For example, the filter 522 may be a coating on the Rx lens 521 or some other optical component of the sensor subsystem 520. The filter 522 may also be located elsewhere along the optical axis of the sensor subsystem 520, e.g., in front of Rx lens 521 or after the polarizer 523.

The light transmitted through band-pass filter 522 is then transmitted through polarizer 523, which eliminates light of polarization other than a desired polarization, e.g., so that the light transmitted therethrough is substantially all H-polarized, or substantially all V-polarized (or right handed circularly polarized, or left handed circularly polarized or other desired polarization state). Although shown as following the band-pass filter 522, the polarizer 523 may be placed elsewhere along the optical axis of the sensor subsystem for example, before the Rx lens 521.

Polarizer 523 may be, for example, a sheet polarizer, a coating applied to an optical element, or a polarizing beamsplitter. The polarizer type may be chosen so that it is relatively insensitive to the angle of incidence of the incoming light. The light transmitted through polarizer 523 is then transmitted through modulator 524, which may be positioned at or near the other image plane of receiving lens 521. In other configurations, the modulator 524 is positioned at a location that is not the image plane. In some cases, it is positioned at or near the pupil plane of the receiving lens 521. In other cases, the modulator is positioned at a plane that is not related to the image or pupil plane of the receiving lens 521. The modulator may be positioned at any arbitrary plane between the receiving lens 521 and the FPA plane (accounting for any other optics illustrated in FIG. 10 that are in the system design). The functionality of modulator 524 is described in greater detail below. The image plane of receiving lens 521 may be at a location in sensor subsystem 520 other than in modulator 524.

The polarizer 523 may be crossed with polarized light that may be emitted from the illumination subsystem 510 in some configurations of system 500. The configuration of the polarizer 523 and polarized light pulse with polarizations at, for example, about 90° relative to each other greatly reduces the effect of glint or bright reflections from highly reflective objects in a scene. Further details of this crossed-polarizer configuration are disclosed in U.S. patent application Ser. No. 16/161,615, entitled "System and Method for Glint Reduction," filed Oct. 16, 2018, which is hereby expressly incorporated by reference in its entirety as though fully set forth herein.

The modulator 524 optionally may be followed by compensator (Cp.) 525, which may correct phase errors that modulator 524 may impose on the beam due to variations in the beam angle or other material phase property, thus further enhancing the acceptance angle of modulator 524. Compensator 525 may include a material having the opposite birefringence of the material in modulator 524. For example, where modulator 524 includes potassium dihydrogen phosphate (KDP), compensator 525 may include magnesium fluoride ($MgF_2$) which has the opposite birefringence of KDP and is commercially available. Other materials may be suitable for use in compensator 525, depending on the characteristics of the material used in modulator 524, such as if the modulator material is potassium dideuterium phosphate (KD*P), compensator materials may be rutile, yttrium lithium fluoride (YLF), urea, or yttrium orthovanadate ($YVO_4$), among other birefringent materials. Additionally, the thickness of compensator 525 may be selected to provide an appropriate contrast ratio over the acceptance angle of the system. For other modulator designs, such as modulator materials that are oriented such that the crystal axis is orthogonal or some other angle to the system optical axis, the compensator may be a second modulator with the crystal axis rotated 90 degrees about the optic axis. In some cases, the compensator material may be the same material as used in the modulator. Also, the compensator and modulator may be combined into a single unit. The compensator may also be an electro-optic material with voltage applied. Examples of modulator and other possible compensator materials are potassium dihydrogen phosphate (and its isomorphs), lithium niobate, lithium tantalate, potassium titanyl phosphate (and its isomorphs), potassium titanyl niobate, barium titanate, and other electro-optically active materials.

Following transmission through and modulation by modulator 524 and optional compensator 525, imaging lens 526 images the modulated light onto first and second FPAs 528, 529. Specifically, polarizing beamsplitter 527 separates the orthogonal polarization components of the modulated beam (e.g., the H- and V-polarization components, or left- or right-handed circularly polarized components), which it then redirects or transmits, respectively, to first and second FPAs 528, 529, which are positioned in the image plane of imaging lens 526. Alternatively, imaging lens is not present, and the FPAs 528, 529 are positioned at or near the image plane of receiving lens 521. Imaging lens 526 may include a single lens, a compound lens, or a plurality of lenses or reflective surfaces. In some configurations, two imaging lens 526 may be placed after the polarizing beamsplitter 527, with one each in front of FPAs 528, 529. First and second FPAs 528, 529 record images of the modulated light imaged upon them, and are in operable communication with controller 541, which obtains the recorded images and provides them to storage 542 for storage and further processing by image constructor 543.

A description of various configurations of modulator 524 and FPAs 528, 529 will now be provided. A description of the calculation of object positions and shapes within the scene is provided in the '895 patent with reference to processor subsystem 540, which subject matter is expressly incorporated by reference herein. As described in the '895 patent, the modulator 524 may be used to vary the polarization of the laser pulse portions reflected from the scene, allowing for the ranges and shapes of objects in the scene to be calculated with high precision. A Pockels cell or a Kerr cell may in some cases be used to perform such a modulation. However, previously known Pockels cells typically have relatively small apertures (e.g., 1 cm or smaller) and small acceptance angles (e.g., less than 1 degree) and operate at relatively high voltages, which may make them undesirable for use in imaging systems. Additionally, the angular extent of the reflected light received by the modulator may be depending on the design of the receiving optical elements and position of the elements. As such, it may be desirable to use a modulator having a wider acceptance angle, a wider aperture, and/or a lower operating voltage. For example, in the three-dimensional imaging system illustrated in FIG. 10 the light captured by receiving (Rx) lens 521 may have angles varying between 5 and 40 degrees and an aperture of 2-4 inches, for example, or any of those previously disclosed above. Thus, the polarization modulator may have a large aperture, a low operating voltage, and a large acceptance angle, e.g., greater than 5 degrees, for example, between 5 and 40 degrees, or other acceptance angles, e.g., between 1 and 180 degrees, or between 1 and 120 degrees, or between 1 and 90 degrees, or between 2 and 40 degrees, or between 5 and 40 degrees, or less than 1 degree. The polarization modulator may have a high contrast ratio, e.g., greater than 300:1, or greater than 500:1. Lower contrast ratios may be used instead, for example, a contrast ratio of 10:1 or 20:1 may be used in some applications.

Configurations of the system 500 in which the modulator 524 is a Pockels cell are further described in the '895 patent, which subject matter is expressly incorporated herein by reference. Although system 500 of FIG. 10 is described in the '895 patent as including a Pockels cell-based modulator, other types of modulators and/or modulation schemes may be used to encode the TOFs of reflected/scattered pulse portions from the scene as an intensity modulation on an FPA, as is further described in the '895 patent, which subject matter is also expressly incorporated herein by reference.

The first and second FPAs 528, 529 are positioned in the focal plane of optional imaging lens 526, and respectively receive light of orthogonal polarizations. For example, polarizing beamsplitter 527 may direct light of V-polarization onto FPA 528, and may transmit light of H-polarization onto FPA 529. In other configurations, FPAs 528 and 529 may receive other polarization arrangements. FPA 528 obtains a first image based on a first polarization component, and FPA 529 obtains a second image based on the second polarization component. FPAs 528, 529 provide the first and second images to processor subsystem 540, e.g., to controller 541, for storage and further processing, as described in greater detail herein. In some cases, FPAs 528, 529 are registered or approximately registered with one another to determine pixel correspondences. Such registration may be performed mechanically, or may be performed electronically (e.g., by image constructor 543).

In an alternative example of system 500 that omits the imaging lens 526, the FPAs may be positioned in the focal plane of the Rx lens 521.

The FPAs 528, 529 may be off-the-shelf CCD or CMOS imaging sensors. In particular, such sensors may be readily commercially available for visible-wavelength applications, and require no significant modification for use in system 500, even for non-visible wavelengths. In some cases, sensors that have improvements in sensitivity or noise for particular wavelengths or angles of incidence or other light properties may be used. In one example, FPAs 528, 529 are commercially purchased CCD sensors having 2 Megapixel resolution. In other examples, the FPAs 528, 529 may be CMOS sensors having 250 k to multi-mega pixel resolution. Combinations of CMOS and CCD image sensor may be used. Some sensors for use in near-infrared applications are currently commercially available. It is anticipated that any of a variety of sensors, including those yet to be invented, may be used successfully in the disclosed systems.

In some circumstances, for example, providing a focal plane array in which each pixel has a deep electron well, e.g., greater than 10,000 electrons, or greater than 30,000 electrons, or greater than 100,000 electrons, may enhance the signal to noise ratio obtainable by the system. The focal plane array also, or alternatively, may have a high dynamic range, e.g., greater than 40 dB, or greater than 60 dB. Additionally, wells of such effective depths may be obtained by combining the outputs of pixels of shallower depth (e.g., 4 pixels each having a well depth of 25,000 or more electrons). Each pixel of the FPA may be designed to substantially inhibit "blooming," so that the electrons of any pixels that may become saturated do not bleed over into adjacent pixels.

The processor subsystem 540 includes controller 541, storage 542, image constructor 543, GPS unit 544, and power supply 545. The subsystem 540 may also include the inertial measurement unit 165 shown in FIG. 2. Not all of such components need be present. The functionalities of such components may alternatively be distributed among other components of system 500, including but not limited to on-board processors on FPAs 528, 529. As described above, controller 541 may be in operable communication with one or more elements of illumination subsystem 510, such light source 511 and transmission (Tx) lens 512, and/or of sensor subsystem 520, such as receive (Rx) lens 521, optional FPA 532, modulator 524, and first and second FPAs 528, 529. For example, modulator 524 may be configured to modulate the polarization of light pulse portions transmitted therethrough as a function of time, responsive to a control signal from controller 541. The controller 541 may send a control signal to voltage source, which applies appropriate voltages to Pockels cells in the modulator 524. Controller 541 is also in operable communication with storage 542, image constructor 543, optional GPS unit 544, inertial measurement unit 165, and power supply 545.

Controller 541 is configured to obtain images from optional FPA 532 and first and second FPAs 528, 529 and to provide the images to storage 542 for storage. Storage 542 may RAM, programmable ROM, flash memory, a hard drive, flash drive, or any other suitable computer-readable storage medium.

The image constructor 543 is configured to process the images stored in the storage 542. Alternatively, the constructor may be configured to operate on images while still in memory of other portions of processor subsystem 540. The functionality of the image constructor 543 and controller 541 may be combined in a single device. The image constructor 543 may be implemented using any suitable type of circuitry, for example, one or more programmable processors, ASICs, FPGAs, discrete logic components or any suitable combination of the foregoing. For example, the image constructor 543 may include one or more programmable devices, such as a microprocessor or digital signal processor (DSP) that are programmed to obtain the stored images from storage 542 and to construct three-dimensional images based thereon, as described in greater detail below. Additionally, the image constructor 543 may also execute programming code that causes it to produce images captured by FPAs 528, 529, 532 by performing the multi-pulse illumination method(s) and techniques disclosed in U.S. patent application Ser. No. 15/857,416, filed Dec. 28, 2017, which is incorporated by reference herein in its entirety.

For example, prior to calculating any TOF values or range values, the image constructor 543 may cause the system 500, under the control of controller 541, to illuminate a target scene with the illumination system 510 and capture images with each of the FPAs 528, 529, 532, or some combination thereof, according to the described 3D imaging operation of the system 500. Each of these captured images are actively illuminated images that result from a multi-pulse illumination scheme disclosed in U.S. application Ser. No. 15/857, 416. The actively illuminated images may each be stored in storage 542. The images may then be used by the system 500 to generate visual and/or 3D images, TOF values, range values or the like as described herein and in further detail the '895 patent.

The controller 541 and/or image constructor 543 of the processor subsystem 540 may be programmed to time the sequence the illumination pulses and detection windows of the system 500 as depicted by FIGS. 3 and 6-7.

The optional GPS 544 is configured to identify the position and/or attitude of system 500 as it obtains images, and to provide such information to storage 542 to be stored with the corresponding images. Additionally, an accelerometer or other suitable attitude measuring device may be used determine an approximate change in attitude of the system 500 from one frame to the next in a series of images. This information may be used as part of a method to register the images to a global or relative reference frame. Power supply 545 is configured to provide power to the other components of processor subsystem 540, as well as to any powered components of illumination subsystem 510 and sensor subsystem 520.

Responsive to the control signal that controller 541 generates, modulator 524 generates a phase delay between orthogonal polarization eigenstates for pulse portions transmitted therethrough. This modulation is described in detail in the '895 patent, which subject matter is expressly incorporated herein by reference. The generated phase delay is what permits the system 500 to calculate a TOF and corresponding range value, z, for each pixel in an image, as described in the '895, which subject matter is also expressly incorporated herein by reference.

In one configuration of the system 500, first and second discrete FPAs 528, 529 and image constructor 543 may constitute an exemplary means for generating a first image corresponding to received light pulse portions and a second image corresponding to modulated received light pulse portions, which may be used to obtain a three-dimensional image based thereon. For example, the first image may correspond to the sum of two complementary modulated images obtained by FPAs 528, 529 (which sum may be computed by image constructor 543, or alternatively, the sum may be computed by on-board circuitry on one or both of the FPAs), and the second image may correspond to the image obtained by FPA 529. In another configuration, a single FPA and image constructor 543 may constitute an exemplary means for generating a first image corresponding to received light pulse portions and a second image corresponding to modulated received light pulse portions, which may be used to obtain a three-dimensional image based thereon. For example, the first image may correspond to the sum of two complementary modulated images obtained by a single FPA (which sum may be computed by image constructor 543), and the second image may correspond to one of the modulated images. Such configurations may include those in which modulators other than a Pockels cell-based modulator were used to modulate the light pulse portions, e.g., an electro-optic Bragg deflector or other modulator provided herein.

In another configuration of the system 500, the initial distance to a key feature may be determined approximately by a single ranging photodiode or several photodiodes during the previous frame. The timing of the center of the modulation period for subsequent frames may be set in one of several ways. For example, it may be set to the initial value, or may be set based on a trend of a key feature in a series of previous frames, or may be set using optical auto-focus techniques. If more than one ranging diode or auto-focus position is used, algorithms similar to those used in optical auto-focus mechanisms to perform a weighted average of these multiple sites or diodes may be used.

With these techniques, the length of the depth of field (distance window) may be adjusted as appropriate, e.g., by varying the duration of the pulse portion modulation imparted by modulator 524 responsive to control signals from controller 541 in FIG. 10. In addition, if it is desired to obtain higher distance resolution over a certain region of the depth of field (DOF), the slope of the modulation may be increased in that region. The slope may then be decreased during the remainder of the modulation period, producing a lower distance resolution in other areas of the scene where the greater resolution is not needed. It should be appreciated that there are many combinations that may be used to achieve a satisfactory three-dimensional image or movie.

Figure 11:
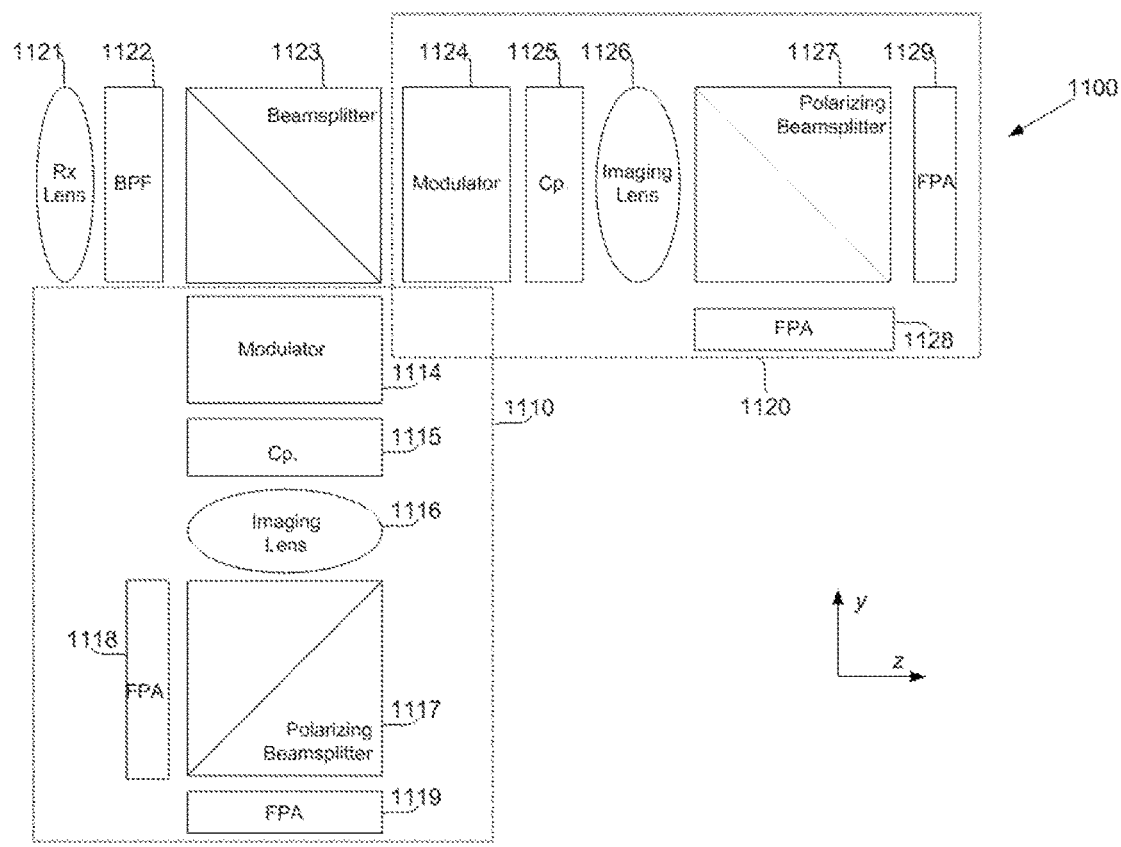
FIG. 11 schematically illustrates a third exemplary 3D imaging system that may be configured to use one or more of the disclosed techniques of interference reduction.

FIG. 11 schematically illustrates a third exemplary 3D imaging system 1100 capable of employing the disclosed techniques for reducing or eliminating interference. More specifically, the system 1100 may be configured to perform any of the interference reduction/elimination methods disclosed herein, and/or may be configured to include any of the components and/or functions disclosed for devices 202, 300, 404. The system 1100 may be configured to act to reduce/eliminate interference autonomously, for example, like the devices 202, 300 in an unsynchronized system. Alternatively, the system 1100 may be configured to operate in a centrally controlled system, such as system 400 of FIG. 8, by including the features of device 404, for example.

The system 1100 includes receiving (Rx) lens 1121 and optional band-pass filter (BPF) 1122, which may be similar to the corresponding elements in FIG. 10, and first and second modulation arms 1110, 1120. System 1100 optionally may also include a visible imaging subsystem such as that illustrated in FIG. 10, but omitted in FIG. 11 for simplicity.

The system 1100 may include the image constructor 543 (not shown) configured to execute programming code that causes it produce images captured by FPAs 1118, 1119, 1128, 1129 by performing any of the interference reduction/elimination techniques disclosed herein, for example, the method described in connection with FIG. 3.

The system 1100 includes beamsplitter 1123, which optionally is a polarizing beamsplitter and which allows some of the light from band-pass filter 1122 to be transmitted to first modulation arm 1120, and redirects other of the light from the band-pass filter to second modulation arm 1110. Other spectral filters may be included. The band-pass (spectral) filter 1122 and any others included may each be a separate optical elements or comined with other optical elements, for example, as a coating. For example, the filter 1122 may be a coating on the Rx lens 1121 or some other optical component of the sensor subsystem 1120. The filter 1122 may also be located elsewhere along the optical axis of the sensor subsystem 1120, e.g., in front of Rx lens 1121.

First modulation arm 1120 includes modulator 1124, optional compensator (Cp.) 1125, optional imaging lens 1126, polarizing beamsplitter 1127, and first and second FPAs 1128, 1129, each of which may be the same as the corresponding components discussed above with reference to FIG. 10. Second modulation arm 1110 includes modulator 1114, optional compensator (Cp.) 1115, optional imaging lens 1116, polarizing beamsplitter 1117, and first and second FPAs 1118, 1119, each of which may be the same as the corresponding components in first modulation arm 1120. System 1100 may also include an illumination subsystem and an image processing subsystem that includes a controller, which may be the same as those described above with reference to FIG. 10. In some configurations, either the modulation arm 1110 or the modulation arm 1120 may only use a single FPA 1119 or 1129, respectively, because the normalization image may be obtained from the other arm.

During operation, the controller (not illustrated) of system 1100 may send different control signals to modulator 1124 than to modulator 1115. For example, the controller may send a control signal to modulator 1124 instructing it to vary the polarization of pulse portions transmitted therethrough monotonically as a function of time. In comparison, the controller may send a control signal to modulator 1114 instructing it to vary the polarization of pulse portions transmitted therethrough non-monotonically, e.g., using a sine wave or sawtooth function that repeats multiple times during the duration of the single monotonic modulation of modulator 1124. The images obtained by FPAs 1128, 1129 on first modulation arm 1120 may contain information about a relatively wide distance window, e.g., a 50 meter window. Because this arm does not need to achieve the same resolution, in some cases it may be useful to choose beamsplitter 1123 such that the fraction of light going to this arm is <50%. In contrast, the images obtained by FPAs 1118, 1119 on second modulation arm 1110 may contain information about a relatively narrower distance window that is encompassed by the wider distance window obtained by the first modulation arm. Information in the image obtained by the first modulation arm may be used to fix the position of objects in the image obtained by the second modulation arm, thus providing for simultaneous three-dimensional measurement across the entire depth of field.

The system 1100 may be configured to measure the polarization state of the light pulse portions reflected/scattered by objects the scene. Such polarization states may, in some circumstances, contain additional information about objects in the scene. For example, natural objects tend to change the polarization state of light they reflect, while man-made objects tend not to do so. There may be techniques to use such polarization information to determine the direction of the surface normal of the object area imaged at a given pixel. This surface normal and the change in the surface normal from pixel-to-pixel may be used to improve the distance resolution and extend the depth of field.

The polarization state of the light pulse portions reflected/scattered by objects in the scene may be determined by modifying system 1100 to replace beamsplitter 1123 with a polarizing beamsplitter. Any light that experienced a polarization rotation upon interaction with objects in the scene may be directed onto the second modulation arm 1110, while light that did not experience a polarization rotation may be transmitted onto the first modulation arm 1120. The controller (not illustrated) may send substantially the same control signals to both modulators 1124, 1114, e.g., instructing the modulators to monotonically (for example, linearly) vary the polarization of light transmitted therethrough over a defined temporal window. Thus, the FPAs on both of the modulation arms 1120, 1110 may obtain two-dimensional intensity images of generally the same scene, over substantially the same distance window. However, the images obtained by FPAs 1118, 1119 on the second modulation arm 1110 will substantially only contain information objects that changed the polarization of the incident light. Such information may be combined with the three-dimensional image obtained using the images from FPAs 1128, 1129 to produce an image having enhanced information content.

Additional details, configurations and functions of certain components of the system 1100 are further described in the '895 patent, which is hereby incorporated by reference in its entirety.

Figure 12:
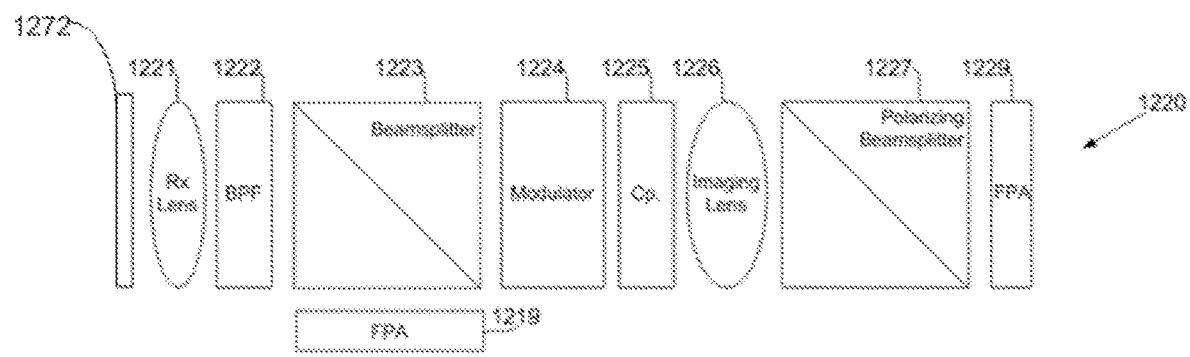
FIG. 12 schematically illustrates an alternative sensor subsystem that may be used with the system of FIG. 10.

FIG. 12 illustrates an alternative sensor subsystem 1220 that may, for example, be used in place of sensor subsystem 520 illustrated in FIG. 10. The subsystem 1220 includes a polarizer 1272 crossed with polarized light that may be emitted from the illumination subsystem 510 in some configurations of the system 500. The configuration of the polarizer 1272 and polarized light pulse with polarizations at, for example, about 90° greatly reduces the effect of glint from highly reflective objects in a scene. Details of the polarizer 1272 and the polarized light source are disclosed in U.S. provisional patent application 62/573,156, which is hereby expressly incorporated by reference in its entirety as though fully set forth herein. The polarizer 1272 may be, for example, a sheet polarizer, a coating applied to an optical element, or a polarizing beamsplitter.

Although not shown in FIG. 10, the polarizer 1272 may also be included in sensor subsystem 520 and used in conjunction with crossed polarized light pulses emitted from the illumination subsystem 510, as described in U.S. provisional patent application 62/573,156. Or the function of polarizer 1272 may be accomplished by polarizer 523 shown in FIG. 10 or any other polarization sensitive element, as described above in connection with FIG. 10. Also, although not shown in FIG. 11, the polarizer 1272 may also be included in system 1100 and used in conjunction with crossed polarized light pulses emitted from an illumination subsystem, as described in U.S. provisional patent application 62/573,156.

Using sensor subsystem 1220, the image constructor 543 (not shown in FIG. 12) may be configured to execute programming code that causes it to produce images captured by FPAs 1219, 1229 and performing any of the interference reduction/elimination techniques disclosed herein.

Sensor subsystem 1220 includes receiving (Rx.) lens 1221, optional band-pass filter (BPF) 1222, modulator 1224, optional compensator (Cp.) 1225, optional imaging lens 1226, polarizing beamsplitter 1227, and FPA 1229, each of which may be the same as described above with respect to the corresponding components illustrated in FIG. 10. However, sensor subsystem 1220 also includes beamsplitter 1223 which is at any suitable position before the modulator (here, between bandpass filter 1222 and modulator 1224), which directs a portion of the received light to FPA 1219, which obtains an image of the scene based thereon. The remainder of the light is transmitted to modulator 1224, which modulates the light transmitted therethrough, and FPA 1229 obtains an image of the scene based thereon. The images obtained by FPA 1219 and FPA 1229 differ in that the former is based on unmodulated light, while the latter is based on modulated light. The image obtained by FPA 1219 may be used to normalize the image obtained by FPA 1229. Specifically, the intensity at any pixel (i,j) of FPA 1219 may be used as the value $I_{total,i,j}$ in the distance calculations discussed with reference to equations (8) to (15) disclosed in the '895 patent, which subject matter is hereby expressly incorporated by reference. In contrast, for the system illustrated in FIG. 10, the value $I_{total,i,j}$ may be calculated by summing the complementary images obtained by FPAs 528, 529. It should be noted that in any alternative arrangement in which a non-modulated image is obtained, the intensity of that image at each pixel (i,j) may be used as the value $I_{total,i,j}$ against which a modulated image may be normalized to obtain distance values, e.g., using equations (8) to (15).

Sensor subsystem 1220 optionally may include visible imaging subsystem 530, omitted from FIG. 12 for clarity.

First and second discrete FPAs 1219, 1229 may constitute an exemplary means for generating a first image corresponding to received light pulse portions and a second image corresponding to modulated received light pulse portions. For example, the first image may correspond to the non-modulated image obtained by FPA 1219, and the second image may correspond to the modulated image obtained by FPA 1229. In another configuration of subsystem 1220, a single FPA constitutes a means for generating a first image corresponding to received light pulse portions and a second image corresponding to modulated received light pulse portions. For example, the first image may correspond to a non-modulated image obtained by the FPA, and the second image may correspond to a modulated image obtained by the same FPA at a different time or using a subset of the pixels included in the FPA.

Other than the polarizer 1272 and the polarized light from the illumination subsystem, the other components of these subsystem 1220 and their operations are further described in the '895, which subject matter is incorporated herein by reference.

Although shown as being located in front of the Rx lens 1221, the polarizer 1272 may be placed elsewhere along the optical axis of the sensor subsystem 1220, for example, after the Rx lens 1221. The polarizer 1272 may be a separate optical elements or combined with one or more other optical elements, for example, as a coating. For example, the polarizer 1272 may be a coating on the Rx lens 1221 or some other optical component of the sensor subsystem 1220.

Figure 13:
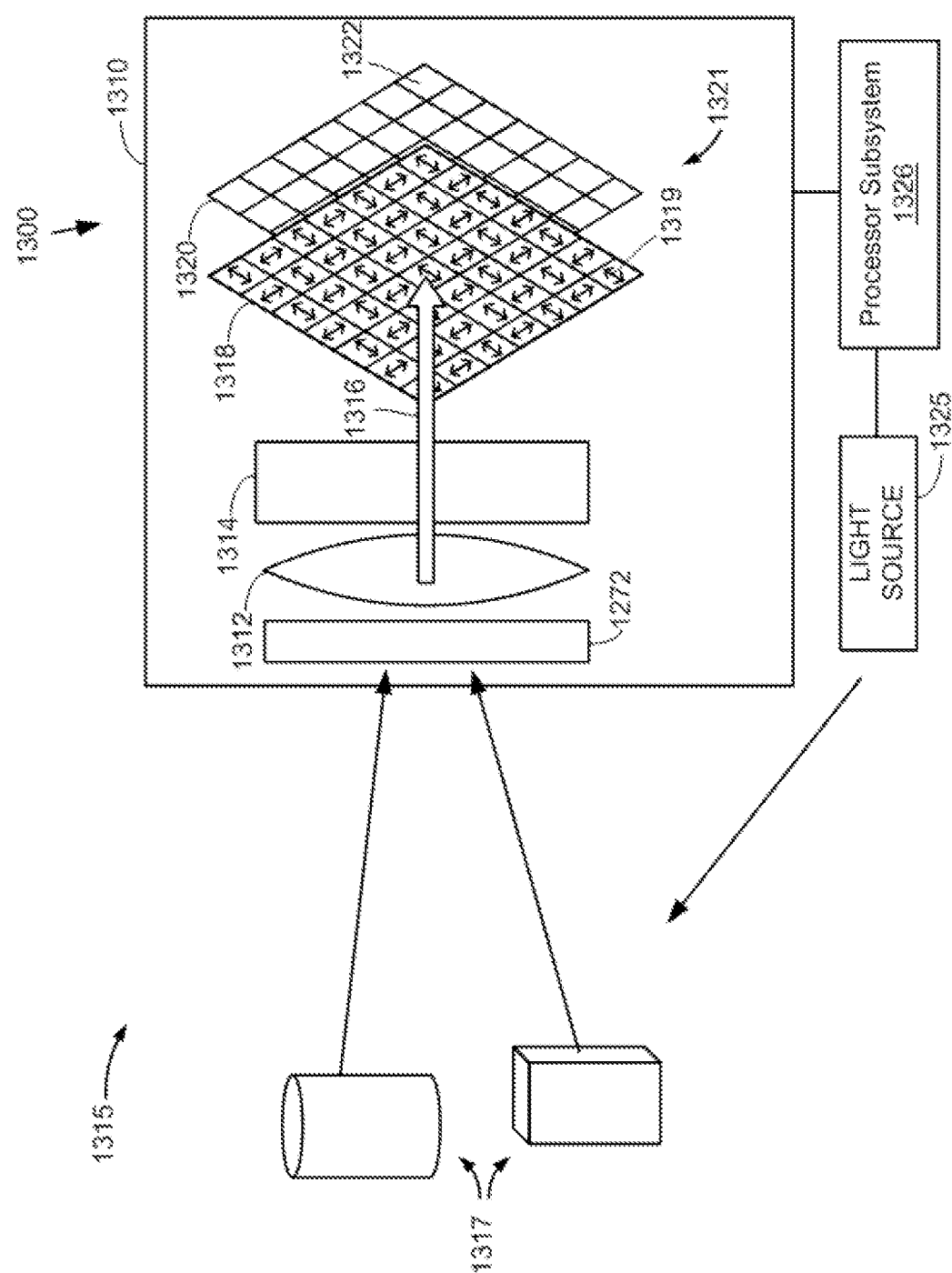
FIG. 13 schematically illustrates a fourth exemplary 3D imaging system that may be configured to use one or more of the disclosed techniques of interference reduction.

FIG. 13 schematically illustrates a fourth exemplary 3D imaging system 1300 that may be configured to employ any of the disclosed techniques for reducing or eliminating interference. More specifically, the system 1300 may be configured to perform any of the interference reduction/elimination methods disclosed herein, and/or may be configured to include any of the components and/or functions disclosed for devices 202, 300, 404. The system 1300 may be configured to act to reduce/eliminate interference autonomously, for example, like the devices 202, 300 in an unsynchronized system. Alternatively, the system 1300 may be configured to operate in a centrally controlled system, such as system 400 of FIG. 8, by including the features of device 404, for example.

The 3D system or camera 1300 includes sensor subsystem 1310, a light source 1325, such as one of the illumination subsystems 110, 510, and a processor subsystem 1326, such as one the processor subsystems 140, 540. The system 1300 operates in a fashion similar to that described earlier for the other disclosed 3D imaging systems in that it illuminates a scene 1315 with multiple light pulses from light source 1325 and then processes portions of the light pulses returned 1316 to the sensor subsystem 1301 to produce 3D images.

However, the several elements of system 1300 provide the capability of a more compact, monolithic design either separately or in combination. Instead of placing complex circuitry and timing algorithms behind each photosensitive pixel, the system 1300 places the required time-dependent elements in front of each pixel or the array of pixels or photo-sensitive elements. Instead of using electronic means to affect the voltage or charge signals at each pixel, the disclosed systems use optical, electro-optic, or other means of affecting the light field in front of each pixel or groups of pixels to affect the photon signal. These optical means may be placed in close proximity to the sensor array, between the sensor array and corresponding optical elements, or in front of such optical elements to allow extraction of time or depth (e.g., z-axis distance) information from the incident light field including time-of-flight information.

The sensor subsystem 1310 includes polarizer 1272, Rx optics 1312, such as Rx optics 172 of FIG. 2, modulator 1314, and module 1321, which includes a polarizing grid array 1318 and an image sensor 1320, such as an FPA as described herein. As shown, the incoming light 1316 is imaged by the Rx optics 1312 onto the image sensor array 1320 through the polarizer array 1318, which has a pattern of polarization directions or transmission parameters such as shown in FIG. 13. For example, the figure shows alternating horizontal and vertical linear polarizers in array 1318 arranged to be in front of each pixel 1322, but other arrangements and/or circular or elliptical polarization can be used.

By placing a polarizing element 1319 in front of each pixel 1322 of the sensor array 1320, certain bulky optics may be eliminated for the system 1300. Such micro-grid polarizing arrays can be used to measure the absolute or relative time-of-flight (TOF). Absolute distance measurements can be used in a 3D camera, for among other things, to reduce error buildup, particularly where multiple objects or surfaces are within the scene and where they are not connected, or the connection is not visible from the camera. Any of the 3D systems disclosed herein can utilize absolute and/or relative TOF.

The use of the polarizing grid 1318 also can reduce the thickness of the glass or other material that is used for polarization separation elements, which reduces the amount of spherical and other optical aberrations. In prior systems, these aberrations either degraded the optical performance of the optical system of the 3D camera, or the optical system must be adapted with custom designs to remove or compensate such aberrations. With the techniques disclosed herein, the amount of aberration compensation required of optical elements is reduced or eliminated, or made sufficiently small where existing lens designs produce sufficiently high optical performance.

Additionally, the use of the polarizing grid 1318 opens the possibility of making the modulator/polarization separation/sensor array into a closely coupled or monolithic optical assembly that can be used directly with catalog optical lens or imaging elements. In some circumstances, such as wafer scale manufacturing, no lenses or relay optics would need be placed between the optical modulator and the sensor array/polarizing grid. This can reduce the size and cost of the 3D camera system.

The use of the modulator 1314 (external to the sensor array) as described in the '895 patent (specifically any of modulators 524, 700-701 1124, 1224 disclosed in the '895 patent, which description is specifically incorporated by reference herein, may be used as modulator 1314) to encode the range information eliminates the need for costly custom sensor array or chip development, especially the challenge of scaling chips that can provide high precision timing information which have been limited to about 200 pixels. Combining the modulator approach with the polarizing grid 1318 coupled and aligned to a sensor array 1320 eliminates the need to have two separate sensor arrays and bulky polarizing components such as a polarizing beamsplitter. With a single sensor array 1320, there is alignment and registration between two virtual arrays. The location of each polarization pixel 1320 may be automatically known relatively to the pixels of the orthogonal polarization in position and angle of any surface normal. This reduces manufacturing and calibration complexity.

As shown in FIG. 13, the electro-optic module 1321 includes a grid of polarization elements 1318 is placed in front of, or alternatively on, the surface of an imaging sensor 1320. The imaging sensor 1320 may be a FPA, such as a charge coupled device (CCD) or complementary metal oxide semiconductor (CMOS) array of pixels, described earlier herein. In some configurations, the polarization grid layer 1318 can be placed directly on the surface of the sensor array 1320 using an additional step or steps in the lithographic processing. In others, the grid layer 1318 can be placed on a transparent substrate that is then placed on or in front of the sensor array. In other configurations, the polarizing grid 1318 can be placed within the layers that are above the detector or electronic sites of a sensor array. The polarizing grid 1318 is aligned such that the center of each polarizing element 1319 is positioned approximately coincident with the center of each pixel 1322. For some configurations, the grid 1318 is arranged so that alternating polarizing elements pass orthogonal polarizations. For example, if the first polarizing element is oriented to pass vertical polarization, the next element in the row or column is oriented to pass horizontal polarization. Instead of linear polarizing elements, orthogonal circular polarizing element, both left-handed and right-handed, can also be used. Other configurations may use other patterns of polarizing elements, including elements that pass non-orthogonal polarizations or are not polarized.

Any suitable manufacturing technique may be employed to build the polarizer element array 1318. For example, the polarizing elements 1318 can be made using a variety of techniques, including metal wire-grid polarizers, thin film polarizing layers, stressed polymers, and elements made of liquid crystal devices as well as any other technique that preferentially passes a particular polarization state over others. In some cases, the polarizing elements can be made of material that can be changed with some control signal, either between each pulse or during the pulse. Such elements can be deposited by a variety of methods using film deposition techniques. Some can be created by lithographic techniques such as interspersed exposure (including by multiple beams or wavelengths), etch, and deposition steps. Other such elements can be created by stretching or otherwise stressing materials such as polymers. Some elements can be created by e-beam or laser writing of shapes and structures of the appropriate spacing or dimensions.

By using lithographic fabrication processes, any polarizer grid to sensor array misalignment and non-uniform spacing, non-ideal polarizer performance, and cross-talk between the pixels can be reduced. Because both the polarizer grid 1318 and the sensor array 1320 can be fabricated using lithographic processes, uniformity of spacing are determined by the mask design, which is normally accurate to nanometer levels. Alignment fiducials can be used to align the two grids 1318, 1320 and lithographic precision permits accurately matching the pitch of the grid elements 1319, 1322.

For some configurations, some of the elements of the polarizer array 1318 may have no polarization properties or reduced polarization properties, forming the basis to determine the normalization signal. Any suitable arrangement of polarization elements and non-polarization elements in the grid 1318 can be used depending on the application and system design. These non-polarization elements can be approximately uniform in transmission for multiple wavelengths or they can vary similar to Bayer patterns for color cameras or different filters for IR or thermal cameras or other arrangements at other wavelengths or wavelength regions. For example, they may be opaque or less transmissive of light.

The processor subsystem 1326 controls the overall operation of the system 1300 and may be configured to cause the system 1300 to capture 3D image data and also perform any of the methods for reducing/eliminating interference described herein, for example, the method of FIG. 3. For example, the processor subsystem 1326 may cause the system 1300 to capture actively illuminated images in accordance with the timelines disclosed in connection with FIGS. 6-7. As described earlier, the processor subsystem 1326 may be the same as either previously described herein.

Additional details about the system 1300 and its operation, as well as various configurations of the array 1318, are described in U.S. published patent application 2017/0248796, entitled "3D Imaging System and Method," filed on Feb. 28, 2017, which is incorporated by reference in its entirety as if fully set forth herein (referred to herein as the "'796 application").

As described earlier in connection with FIG. 12, the polarizer 1272 is crossed with polarized light emitted from light source 1325 to eliminate the effects of glint and reflections from objects in the scene, as described in U.S. provisional patent application 62/573,156, which is incorporated herein by reference. In some configurations of the system 1300, the crossed polarizer 1272 and polarized light source may be omitted. Although shown as being located before the Rx lens 1312, the polarizer 1272 may located elsewhere along the optical axis of the sensor subsystem 1310. The polarizer 1272 may be a separate optical element as shown, or alternatively, it may be combined with any of the other optical elements in the sensor subsystem 1310. For example, the polarizer 1272 may be an optical coating on a sensor subsystem optical element, such as Rx lens 1312 or the modulator 1321.

The camera 1300 may capture 3D information and also capture image or video from a scene 1315 having objects 1317 that scatter or reflect illumination light emitted from a light source 1325. The light source 1325 may be integrated with the sensor subsystem 1310 into the system 1300, as an illumination subsystem such as described in the '895 patent, or alternatively, it may be separated from the camera 1300. The light source 1325 may be any suitable means for illuminating the scene 1315 with polarized light, including those described in the '895 patent or any of those disclosed herein. Alternatively/additionally, the light source 1325 may include any of the compact illuminators and/or driver circuitry disclosed in co-pending U.S. patent application Ser. No. 15/845,719, entitled "Driver Circuit Usable for Supplying Pulsed Light Source," filed on Dec. 18, 2017, which is hereby incorporated by reference as though fully set forth herein in its entirety.

Although shown as having separated elements in FIG. 13, in some configurations of the camera system 1300, the electro-optic module 1321 may include the optical modulator 1314, grid 1318, and sensor array 1320, as well as an optional polarizer (not shown) located in the optical path before the modulator 1314 integrally formed together as a single unit. This highly integrated configuration of the electro-optic module 1321 may be constructed using the lithographic, etching and deposition techniques described in the '796 application, which subject matter is expressly incorporated by reference.

A compact 3D camera system may be achieved by integrating the elements of a modulated sensor approach described in the '895 patent with a polarizing or transmission grid array, such as grid array 1318. Examples of 3D imaging systems and methods that may be modified to implement the methods and systems described herein are disclosed in the '895 patent at, for example, FIGS. 1-12 and their accompanying written description in the '895 specification. Those portions of the '895 patent describe 3D imaging systems that can be configured to perform the methods and to include the polarizing or transmission grid arrays disclosed herein and are specifically incorporated by reference herein.

The data streams produced and processed by the 3D camera become simpler since there is only one sensor array and no need to time with other sensor arrays. It also becomes simpler to combine multiple 3D cameras or modules together as described in the '895 patent (for example, to use different range windows and modulation waveforms to extend the range window without worsening the range resolution achievable), such as described in the '895 patent with reference to FIG. 10, which portions of the '895 patent are specifically incorporated by reference as though fully set forth herein.

Alternatively, for other modulation schemes, such as Fabry-Perot cavities or other phase-based modulation schemes, where polarization modulation is not used, arrays of elements that vary in transmission between elements in some pattern similar to that described above can be employed instead of polarization elements. Thus, in these schemes, polarizers and polarization elements may be optional. Some elements can be relatively low transmission that may provide the needed finesse for a Fabry-Perot cavity while some elements can be relatively high transmission. The high transmission elements (coupled with high transmission elements on the other side of the Fabry Perot cavity) can be used to determine the unmodulated reference signal, including interpolating the signal to the lower transmission elements for determination of the relative modulation signal as described in the base patent. The arrangement of these pixels can be grouped in various ways, as described in the '796 application, which is expressly incorporated by reference. Examples of alternative sensor systems that may be included in any of the methods, components, devices and/or systems disclosed herein are further described in U.S. provisional patent application 62/729,862, entitled "Electro-Optic Modulator and Methods of Using Same and Manufacturing Same for Chip Scale 3-Dimensional LIDAR Imaging," filed on Sep. 11, 2018, which is hereby incorporated by reference in its entirety.

Figure 14:
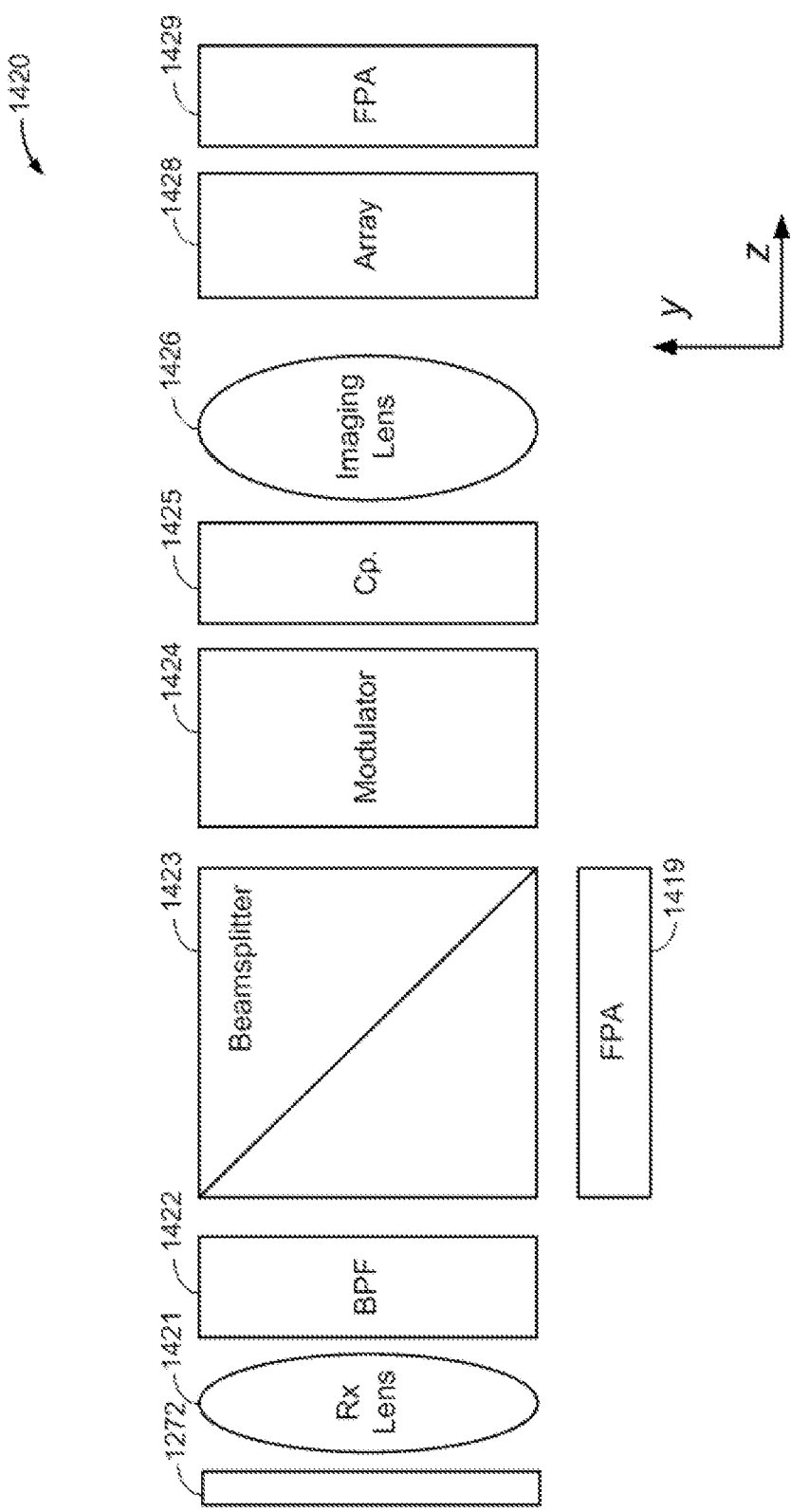
FIG. 14 schematically illustrates another alternative sensor subsystem that may be used with the system of FIG. 10.

FIG. 14 illustrates another alternative sensor subsystem 1420 that may, for example, be used in place of sensor subsystem 520 illustrated in FIG. 10. Sensor subsystem 1420 includes the polarizer 1272, a modulator 1424 and a polarizing grid array 1428. Sensor subsystem 1420 optionally may include visible imaging subsystem 530 show and described in connection with FIG. 10. The subsystem 530 is omitted from FIG. 14 for clarity.

The subsystem 1420 includes polarizer 1272, receiving (Rx) lens 1421, band-pass filter (BPF) 1422, modulator 1424, compensator (Cp.) 1425, optional imaging lens 1426, and FPA 1429, each of which may be the same as described with respect to the corresponding components illustrated in FIG. 10 (except for polarizer 1272). However, system 1420 also includes polarizer 1272 and element grid array 1428, which may be the polarizing array 1318 or any of the polarizing arrays or transmission-based arrays described, for example, with reference to FIGS. 2-7 of the '796 application, which subject matter is incorporated herein by reference.

Some configurations may use all camera elements shown in FIG. 10. For example, the system 1420 can include optional beamsplitter 1423 which is at any suitable position before the modulator (here, between bandpass filter 1422 and modulator 1424), which directs a portion of the received light to FPA 1419, which obtains an image of the scene based thereon. The remainder of the light is transmitted to modulator 1424, which modulates the light transmitted therethrough, and FPA 1429 obtains an image of the scene based thereon. In some configurations, the images obtained by FPA 1419 and FPA 1429 may differ in that the former is based on unmodulated light, while the latter is based on modulated light. The image obtained by FPA 1419 may be used to normalize the image obtained by FPA 1429. Specifically, the intensity at any pixel (i,j) of FPA 1419 may be used as the value $I_{total,i,j}$ in the distance calculations discussed in the '895 patent with reference to equations (8) to (15), which subject matter is specifically incorporated by reference as if fully set forth herein. Alternatively, in some configurations the intensities measured by FPA 1419 are not needed, instead using the demosaiced intensity sum from FPA 1429.

In other configurations, FPA 1419 is used for images a different wavelength or wavelengths, such as visible light or infrared light or other spectral region. In other configurations, some of the components shown may be omitted or changed in order. For example, in some configurations, the beamsplitter 1423 may be replaced by another variety of polarizing plate or optic or for some instances, omitted altogether if the incident polarization state is of sufficient quality. In some configurations, the compensator 1425 and/ or imaging lens can be omitted. Alternatively, the components 1424 through 1428 or some subset thereof can be repeated in other configurations between beamsplitter 1423 and the FPA 1419. The signals obtained from either or both of the FPAs 1419, 1429 can be combined in algorithms described in the '895 patent.

In some configurations of sensor 1420, the beamsplitter 1423, imaging lens 1426, and FPA 1419 are omitted. As described earlier in connection with FIG. 12, the polarizer 1272 is crossed with polarized light emitted from the illumination subsystem to eliminate or reduce the effects of glint and reflections from objects in the scene, as described in U.S. provisional patent application 62/573,156, which is incorporated herein by reference. In some configurations of the subsystem 1420, the crossed polarizer 1272 and glint reduction techniques may be omitted.

Other techniques described in the '895 patent can be combined with a 3D camera using such a transmission array disclosed herein.

Each of the systems and/or devices 10, 200, 202, 300, 400, 404, 450, 500, 1100, 1300 can be a LIDAR system for measuring distances to objects in a scene by illuminating those objects with a pulsed laser light, and then measuring the reflected pulses with a sensor. Differences in laser return times can be used to make digital 3D-representations of the target scene. The LIDAR applications of the systems are useful in automotive applications, particularly using one or more of the systems as a sensor on an autonomous vehicle to detect and sense objects and their positions around the vehicle. In such an application, one or more of the systems can be mounted on the vehicle to cover fields of view around the vehicle. The systems can detect objects and their positions around the vehicle in real-time as the vehicle moves along roadways and in traffic. The LIDAR variants of the systems may be useful for other applications, such as robotic vision, surveying, video game controls, visual effects, augmented-, mixed-, virtual-reality or similar, mapping, handheld devices such as cameras, smartphones, or the like, and other applications where it is useful to know coordinate or location information about areas of the real-world.

Additionally or alternatively, the pulse light source and methods described in U.S. patent application Ser. No. 14/696,793 filed Apr. 27, 2015, entitled "Method and System for Robust and Extended Illumination Waveforms for Depth Sensing in 3D Imaging" may be used with the systems and methods disclosed herein, and the subject matter of that application is hereby expressly incorporated by reference in its entirety as though set forth fully herein.

Additionally or alternatively, any of the electro-optic modulators disclosed in co-pending U.S. patent application Ser. No. 15/857,263, entitled "Wide Field of View Electro-Optic Modulator and Methods and Systems of Manufacturing and Using Same," filed on Dec. 28, 2017 may be incorporated in the 3D systems disclosed herein as a modulator and/or compensator. The subject matter of U.S. patent application Ser. No. 15/857,263 is hereby expressly incorporated by reference in its entirety as though set forth fully herein.

To accomplish external illumination signal interference reduction/elimination and achieve lower illuminator costs, some versions of the systems disclosed herein may be additionally configured to include the techniques and methods of ambient light reduction described in co-pending U.S.

patent application Ser. No. 15/823,482 and/or the multi-pulse illumination image processing techniques described in co-pending U.S. patent application Ser. No. 15/857,416. The subject matter of both of these applications is hereby incorporated by reference as though fully set forth herein in its entirety.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or component for purposes of clarity, it should be understood that the techniques of this disclosure may be performed by any suitable combination of components or modules associated with an active illumination device or system.

The foregoing description is illustrative and not restrictive. Although certain exemplary embodiments have been described, other embodiments, combinations and modifications involving the invention will occur readily to those of ordinary skill in the art in view of the foregoing teachings. Therefore, this invention is to be limited only by the following claims, which cover the disclosed embodiments, as well as all other such embodiments and modifications when viewed in conjunction with the above specification and accompanying drawings.

What is claimed is:

1. A 3D imaging system, comprising:
   an illuminator;
   a modulator configured to encode time of flight (TOF) as intensity modulation; a sensor, in which the sensor and the modulator have a common optical axis and field of view, the sensor configured to generate a reference image based on light received at the sensor from a scene in the field of view, wherein the modulator is located between the sensor and receive optics;
   a compass; and
   a processor, operatively coupled to the sensor and the illuminator, the processor configured to:
      detect interference in the reference image;
      determine a direction of travel of the 3D imaging system based on one or more readings from the compass; and
      change the timing of an illumination signal of the illuminator as a result of detecting the interference and based on the direction of travel of the 3D imaging system.

2. The 3D imaging system of claim 1, wherein the interference is caused by an illumination signal emitted by an active illumination device.

3. The 3D imaging system of claim 1, wherein the processor is configured to detect the interference by:
   determining one or more intensity values for one or more pixels included in the sensor;
   comparing the intensity values to at least one intensity threshold value; and
   detecting the interference if a predetermined number of intensity values exceeds the intensity threshold value.

4. The 3D imaging system of claim 1, wherein the illumination signal is periodic.

5. The 3D imaging system of claim 1, wherein the processor is further configured to advance or retard the timing of the illumination signal.

6. The 3D imaging system of claim 1, wherein the processor is configured to select a start time for the illumination signal by applying a randomizing function to a predetermined value associated with the apparatus.

* * * * *